(12) United States Patent
MacInnis

(10) Patent No.: US 11,706,272 B2
(45) Date of Patent: *Jul. 18, 2023

(54) ADAPTIVE STREAMING WITH EARLY CLIENT INDICATION

(71) Applicant: Avago Technologies International Sales Pte. Limited, Singapore (SG)

(72) Inventor: Alexander Garland MacInnis, Los Altos, CA (US)

(73) Assignee: Avago Technologies International Sales Pte.Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,196

(22) Filed: Oct. 24, 2022

(65) Prior Publication Data

US 2023/0037292 A1    Feb. 9, 2023

Related U.S. Application Data

(60) Continuation of application No. 16/925,896, filed on Jul. 10, 2020, now Pat. No. 11,483,360, which is a
(Continued)

(51) Int. Cl.
*H04L 65/60* (2022.01)
*H04L 65/80* (2022.01)
(Continued)

(52) U.S. Cl.
CPC .............. *H04L 65/60* (2013.01); *H04L 65/61* (2022.05); *H04L 65/762* (2022.05); *H04L 65/80* (2013.01)

(58) Field of Classification Search
None
See application file for complete search history.

(56) References Cited

U.S. PATENT DOCUMENTS

2005/0281328 A1    12/2005    Hurst et al.
2010/0312828 A1    12/2010    Besserglick et al.
(Continued)

OTHER PUBLICATIONS

Non-Final Office Action on U.S. Appl. No. 14/923,113 dated Sep. 18, 2018 (16 pages).
(Continued)

*Primary Examiner* — Tonia L Dollinger
*Assistant Examiner* — Jonathan A Sparks
(74) *Attorney, Agent, or Firm* — Foley & Lardner LLP

(57) ABSTRACT

Methods and systems for early identification of bitrates for segments in adaptive bitrate streaming can allow the server to begin processing or transcoding content as necessary for delivery, reducing processing and transmission latency. In a first aspect, a client may request a second segment before the first segment has been completely received. The server may begin any transcoding processes for preparing the second segment, and once the server has completed sending the first segment, the server may begin transmitting the now-prepared or partially prepared second segment. The server can then transmit the first and second segment contiguously, with essentially no network dead time. In a second aspect, the client may transmit an early notification of parameters for the request of the second segment, allowing the server to begin transcoding. The client may subsequently request the already-prepared or partially prepared second segment, similarly reducing request-response processing latency.

25 Claims, 11 Drawing Sheets

Related U.S. Application Data division of application No. 14/923,113, filed on Oct. 26, 2015, now Pat. No. 10,749,918.

(60) Provisional application No. 62/077,553, filed on Nov. 10, 2014.

(51) Int. Cl.
*H04L 65/61* (2022.01)
*H04L 65/75* (2022.01)

(56) References Cited

U.S. PATENT DOCUMENTS

| | | |
|---|---|---|
| 2012/0265856 A1 | 10/2012 | Major et al. |
| 2013/0097309 A1 | 4/2013 | Ma et al. |
| 2013/0191511 A1 | 7/2013 | Liu et al. |
| 2013/0227081 A1 | 8/2013 | Luby et al. |
| 2013/0329781 A1 | 12/2013 | Su et al. |
| 2014/0247722 A1 | 9/2014 | Furbeck et al. |
| 2014/0359140 A1 | 12/2014 | Shankarraman |
| 2015/0172340 A1 | 6/2015 | Lohmar et al. |
| 2015/0341634 A1 | 11/2015 | Jiang |
| 2016/0057468 A1* | 2/2016 | Hirabayashi ....... H04N 21/8456 725/25 |

OTHER PUBLICATIONS

Non-Final Office Action on U.S. Appl. No. 14/923,113 dated Sep. 19, 2019 (19 pages).
Notice of Allowance on U.S. Appl. No. 16/925,896 dated Jun. 23, 2022.
Notice of Allowance on U.S. Appl. No. 14/923,113 dated Apr. 8, 2020 (16 pages).
U.S. Office Action on U.S. Appl. No. 16/925,896 dated Nov. 18, 2021.

* cited by examiner

ADAPTIVE STREAMING WITH EARLY CLIENT INDICATION

RELATED APPLICATIONS

The present application claims the benefit of and priority as a continuation of U.S. application Ser. No. 16/925,896, entitled "Adaptive Streaming with Early Client Indication," filed Jul. 10, 2020, (U.S. Pat. No. 11,483,360) which claims priority to U.S. Nonprovisional application Ser. No. 14/923,113, now U.S. Pat. No. 10,749,918, entitled "Adaptive Streaming with Early Client Indication," filed Oct. 26, 2015, which claims priority to U.S. Provisional Application No. 62/077,553, entitled "Adaptive Streaming with Early Client Indication," filed Nov. 10, 2014, the entirety of each of which is incorporated by reference herein for all purposes.

FIELD OF THE DISCLOSURE

This disclosure generally relates to systems and methods for streaming multimedia. In particular, this disclosure relates to systems and methods for low latency rate adaptive streaming.

BACKGROUND OF THE DISCLOSURE

Adaptive bitrate (ABR) streaming allows delivery of media to client devices at bitrates that may be dynamically adjusted based on network congestion, latency, processing delays, etc. so as to provide a stream at the best quality possible without interruption. In one implementation, a media stream may be divided into a plurality of short portions on the order of a few seconds, with each portion or segment encoded at a plurality of bitrates. In low congestion or latency periods, the client may request high quality segments from a media server, while in high congestion or latency periods, the client may request low quality segments. The client may thus dynamically adjust the quality of the stream, on a segment by segment basis.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

In implementations of ABR streaming utilizing pre-recorded or encoded content, a server, such as a media server or web server, may make multiple representations of a media stream available, each representation comprising a plurality of segments of the stream encoded at different bitrates. Segmentation may be consistent between representations, such that a client device may dynamically switch between representations, selecting a first segment at a first bit rate, then a subsequent segment at a second bitrate, with bitrates typically chosen based on the measured performance of the network and/or processing delays. When the measured network performance is faster than required for a segment or when a device processor has more than enough processing capability to decode segments, the client may choose a higher bitrate representation for the next or some future segment, and when the measured network performance is slower than required for a segment or when the device processor is overloaded, the client may choose a lower bitrate representation for the next or some future segment. In some implementations, the client may request a bitrate explicitly (e.g. with a request identifying a specified bitrate or quality of a plurality of qualities, including resolution, bit depth, size, encoding bitrate, etc., or any combination of these or other qualities), while in other implementations, segments may be stored with different file names or at addresses indicating bitrates (e.g. http://www.example.com/mediafile/segment01_low.mpg, http://www.example.com/mediafile/segment02_high.mpg, etc.). The server may provide the requested representation of each segment via an appropriate protocol, such as via hypertext transmission protocol (HTTP) transfer over transmission control protocol (TCP) over internet protocol (IP); via file transfer protocol (FTP) transfer over TCP; via a lossy protocol such as the user datagram protocol (UDP); or any other such method. The bandwidth required by each stream is adapted by the client to correspond roughly to the actual network performance end to end from the server to the client.

Figure 1A:
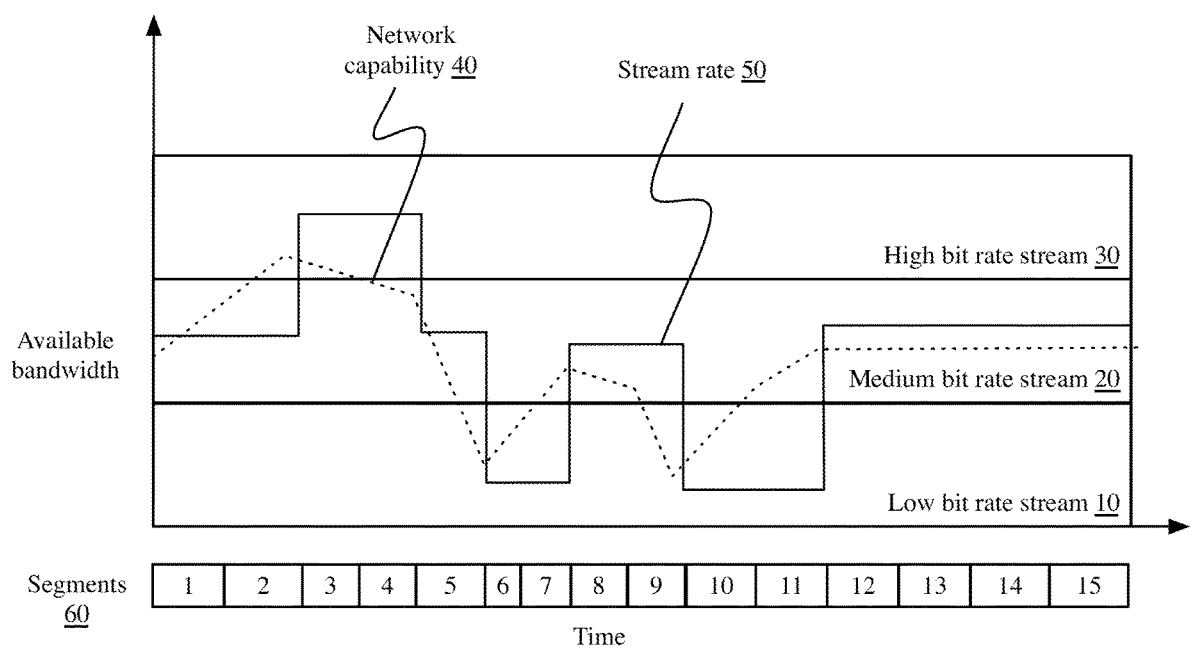
FIG. 1A is a graph depicting an exemplary embodiment of selection of a stream rate over time based on varying network capability.

FIG. 1A is a graph depicting an exemplary embodiment of selection of a stream rate over time based on varying network capability. As shown, a server may provide a plurality of segments 60 at various bitrates 10-30. A network capability 40 may vary over time, depending on congestion, packet loss, processing capacity at the server and/or client, etc. The client may select a representation (e.g. low bitrate, medium bitrate, or high bitrate) of each segment dynamically, based on the network capability 40, providing a resulting dynamic "best quality" stream 50. In the example illustrated, segments 1 and 2 are at a medium bitrate 20. Responsive to an increase in network capability 40, the client may select segments 3 and 4 at a high bitrate 30. As capability 40 falls, the client may select lower bitrates for segments 5 (medium bitrate 20), and 6 and 7 (low bitrate 10). Typically, the client's requests will lag behind network performance changes because the client has to prepare requests based on previously measured network characteristics: for example, if performance is measured by the amount of time to download a previous segment, then the client may request a segment at a determined bitrate regardless of further increases or decreases in network capability after preparing the request or during download of the segment. As shown, segments need not be the same length, but may vary based on complexity of content and/or may be timed to fill specified time periods (e.g. interstitial commercial breaks, etc.). Each segment may nonetheless be identical in length and timing in each alternate bitrate representation of the same segment, as discussed above, such that the client may dynamically select any representation of each segment for seamless playback.

In typical implementations with file servers, multiple representations of each stream may be preprocessed or encoded and stored for subsequent transfer to clients. However, ABR delivery of live content introduces additional complexity, as the representations cannot be pre-encoded far in advance of the times that clients request them. Similarly, some file servers, sometimes referred to as live transcoding servers, store content in a first format and transcode the content on demand into one or more additional formats, according to client requests and/or network performance. In typical implementations, the client requests a subsequent segment of a selected representation only after receiving all of the previous segment. When sequential segments use the same bitrate representation, the server can pipeline its operations and code and store at least a partial segment before it is requested by the client, and begin to transmit the segment immediately after receiving a request for that segment. However, if the second segment has a different bitrate representation than the first segment, the server may need to begin generating the requested representation-segment or transcoding the segment from an input stream. Generally a server that transcodes or encodes one representation at a time of each stream cannot begin to perform the generation or transcoding until it has received the request for that representation-segment, typically after the server has completed transmission of the first segment. This results in additional latency in starting to produce the requested coded segment at the requested representation, causing a delay in creation and transmission of the requested segment. This delay results in dead time on the network, leading to a reduced measured network performance. From the perspective of the client, requests take longer to fulfill, leading the client to request lower and lower bitrates.

Figure 1B:
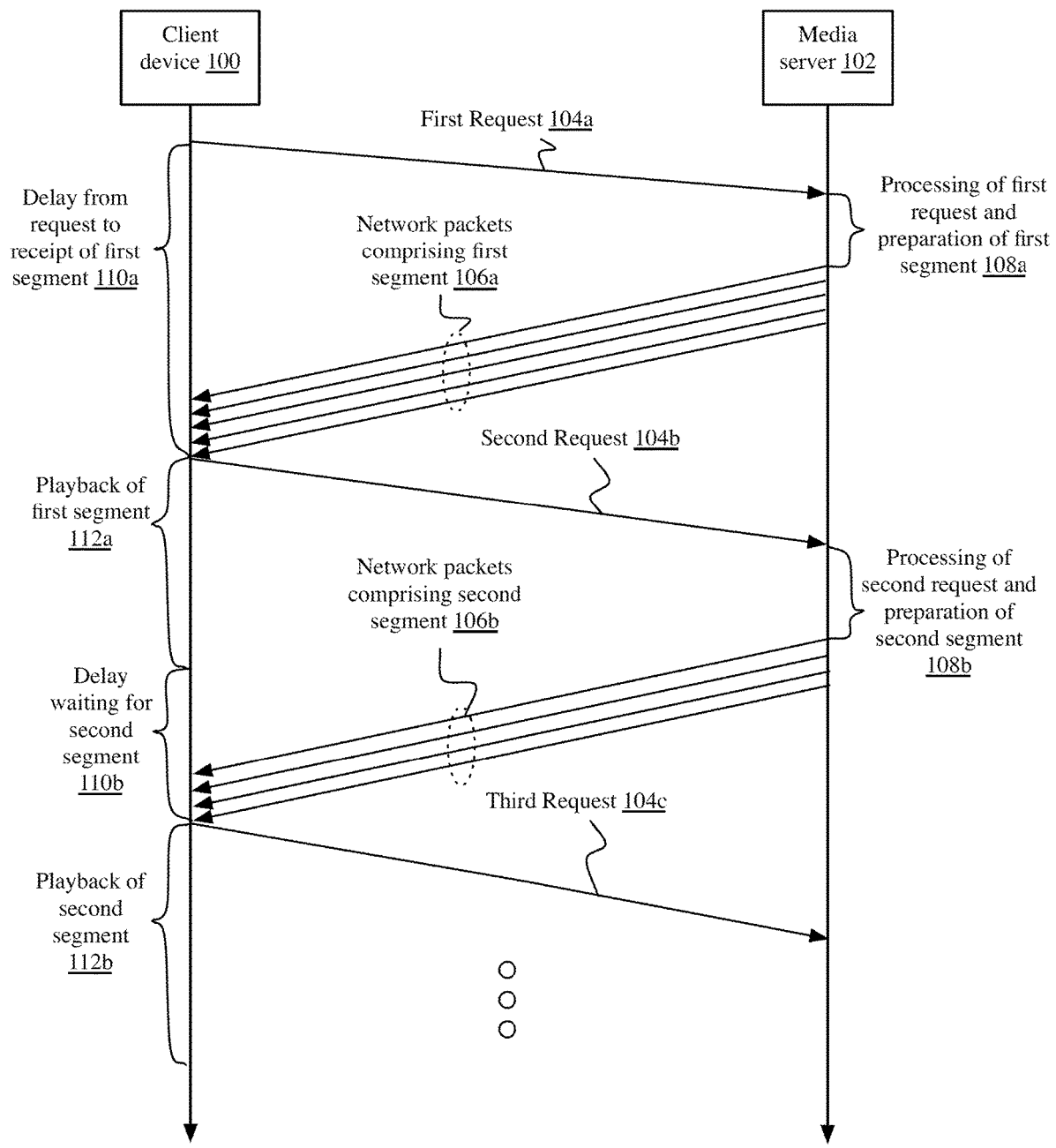
FIG. 1B is a signal flow diagram depicting an embodiment of ABR streaming.

FIG. 1B is a signal flow diagram depicting one such embodiment of ABR streaming between a client device 100 and media server 102. As shown, at a first time, the client device 100 may transmit a first request 104a to the server 102. The server may process the request and prepare the first segment for transfer during time period 108a, and may transmit the first segment via one or more packets at 106a. In many implementations, transmissions of segments may take a significant period of time, may be divided over multiple packets as shown (e.g. for payloads larger than a maximum transmission unit (MTU) size for the connection), or otherwise result in a period of time from beginning of receipt of a segment to end of receipt of the segment. This time is in addition to the time taken for any individual packet to traverse the network, which may be significant. For example, although not shown to scale in FIG. 1B, in some implementations, the time for a packet to traverse the network from the media server to the client device may be several times the time taken to process the request and/or prepare the segment. Time taken to process and/or transmit the segment or packets comprising the segment results in a delay 110a or round trip time from the transmission of the first request 104a to end of receipt of the first segment 106a, and may be incurred before initial playback may begin. In some implementations, playback may begin immediately, while in other applications, a client may wait until several segments are received. This may allow the client to buffer several segments, helping to avoid future disruptions in playback. For example, the client may request and buffer several segments 106 before beginning playback of the first segment at 112a. However, if network delays cause further segments to be received at a slower rate than playback of buffered segments, the client may exhaust the buffer or playback all queued segments prior to receiving a next segment. In such cases, the client may incur a delay as at 100b after playback is complete before a subsequent segment is received.

As discussed above, the amount of total delay 110a or portions such as processing time 108a may appear to the client to be a decrease in the measured network performance, which may cause the client to request lower segment qualities or bitrates for subsequent segments.

Once the first segment is received and/or during playback of the first segment 112a, the client may transmit a second request 104b to the media server (although in some implementations, the request may be transmitted in advance of playback, such as when buffering multiple segments prior to playback). If the second request 104b is for a segment at a different bitrate than first segment 106a, for example, due to detected network congestion or the network performance being less than expected for the representation used in one or more previous segments (e.g. as a result of a delay 110a between transmission of a request for a segment and end of receipt of the segment), then the media server 102 may not begin processing of the second request and preparation of the second segment during time period 108b until after receipt of request 104b (or, in some implementations, the media server 102 may have already started preparing a second segment at the same bitrate as first segment 106a, and may have to discard the second segment or restart preparation of the segment at the new requested bitrate of second request 104b). After processing of at least a portion of the segment is complete, the server 102 may begin to transmit the second segment 106b to the client device 100 (e.g. begin transmission of a first portion of the segment in a first packet while continuing to process a later portion of the segment); however, if playback of the first segment 112a has ended, then the system incurs another delay 110b while waiting for the second segment (although, as discussed above, in many implementations, a client may buffer a plurality of segments in an attempt to avoid such interruptions). This delay 110b is a result of having consumed or played back the first segment or having otherwise exhausted a buffer of segments in implementations in which several segments are requested prior to second segment 106b, and may be due to delays in processing the segment, worsening network conditions causing greater transmission times, packet losses and retransmissions, etc. The client may perceive the delay 110b as an indication of further network or processing congestion, and issue a third request 104c, such as during playback of the second segment 112b, for a third segment at yet another, lower bitrate representation. This may again result in a delay in preparation of the segment, increased transmission and playback delays, and result in the client requesting lower and lower bitrate representations until reaching a lowest-provided rate. The result is low video quality and/or discontinuous video display in the client, which is undesirable.

Accordingly, the systems and methods discussed herein provide early identification of future representation selections, allowing the server to begin processing or transcoding content as necessary for delivery, reducing server-side latency. In a first aspect of the present disclosure, a client may request a second segment before the first segment has been completely received. The server may begin any transcoding processes for preparing the second segment, and once the server has completed sending the first segment, the server may begin transmitting the now-prepared or partially prepared second segment. In many implementations, transmission of a segment may begin while the segment is still being encoded or transcoded to reduce processing latency. The client may not need to send another request for the second segment in one such implementation; rather, the server may maintain a stateful connection or store an indicator that the client has requested the second segment at the identified bitrate. The server can then transmit the first and second segment contiguously, with essentially no network dead time.

In some implementations, it may not be desirable to maintain a stateful connection or buffer or store client requests on the server. Accordingly, in a second aspect of the present disclosure, before a client has received some or all of a first segment, the client may send an early indicator or message to a server identifying which representation it will request for the second segment. The server may then begin transcoding or preparing the second segment for transmission. Once the first segment has been fully received, the client may transmit the request for the second segment at the identified representation, and the server may immediately respond with the now-prepared or partially-prepared second segment. In such implementations, the server may not need to maintain any knowledge of a state of the client, but may simply act upon each request as received. In some implementations, early indicators may be used regardless of whether a server accepts or interprets the messages, allowing backwards compatibility by clients utilizing early indicators with servers that do not process early indicators. In a further implementation, the first and second aspects may be combined with early indicators and queuing of early-transmitted requests by the server, eliminating both processing and transmission latency on the server. For example, in some implementations, a client may transmit an early indication of a bitrate of a subsequent request, and may also transmit the subsequent request without waiting for a previous segment to be received.

In a similar third aspect of the present disclosure, the client need not be constrained by the early indicator or message, but may request the same or a different representation of the second segment. This may particularly allow the client to respond to quickly degrading network or processing capability.

In a fourth aspect of the present disclosure, the server may monitor network and/or processing capacity and may select a bitrate for a next segment or predict which representation the client will request for the next segment. In some implementations the server may adjust the bitrate of a segment after the start of the segment, for example to accommodate changes in monitored network performance. In some implementations, the client may transmit early messages or notifications as discussed above, not to identify or select a next representation that will be selected, but to indicate network or processing performance, and the server may use the messages to predict bitrates that will selected by the client.

Figure 2A:
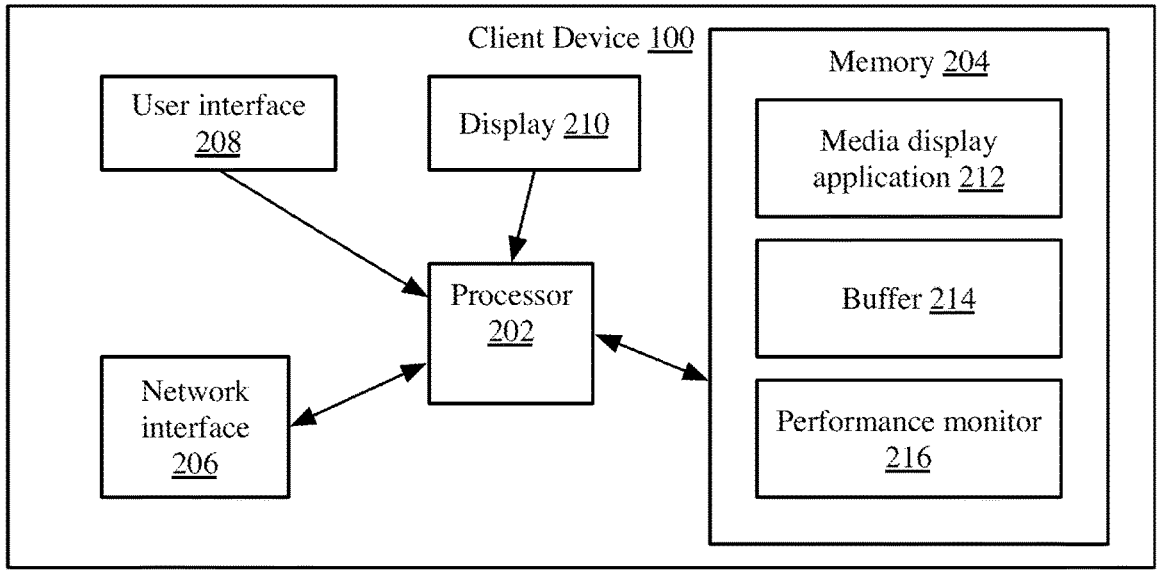
FIG. 2A is a block diagram depicting an embodiment of a client device for ABR streaming.

FIG. 2A is a block diagram depicting an embodiment of a client device 100 for ABR streaming and providing early requests and/or indicators as discussed above. Device 100 may comprise any type and form of computing device, including a desktop computer, laptop computer, tablet computer, smart phone, portable computer, wearable computer, embedded computer, set-top box, smart television, video game console, or any other type and form of device for receiving, decoding, and displaying a media stream. Device 100 may be a physical device or may be a virtual device, such as a virtual machine, executed by a physical device. Device 100 may be a thin client providing interaction with a remote machine. Device 100 may be variously referred to as a client device, a client, a user device, a personal device, or by any other similar terms.

Client device 100 may include a processor 202, sometimes referred to as a central processing unit or microprocessor. The processor 202 is any logic circuitry that responds to and processes instructions fetched from memory 204 and/or controls other components within device 100 including a user interface 208, network interface 206, and/or a display 210. In many embodiments, the processor 202 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The device 100 may be based on any of these processors, or any other processor capable of operating as described herein.

Device 100 may include a memory 204, sometimes referred to as a main memory unit 204. Memory 204 may be one or more memory chips capable of storing data and allowing any storage location to be directly accessed by the processor 202, such as any type or variant of SRAM, DRAM, FRAM, NAND Flash, NOR Flash, or SSD. The memory 204 may be based on any of the above described memory chips, or any other available memory chips capable of operating as described herein. Processor 202 may communicate with memory 204 via a system bus or memory port, such as a backside or frontside bus, a system bus, a VESA VL bus, an ISA bus, an EISA bus, a MicroChannel Architecture (MCA) bus, a PCI bus, a PCI-X bus, a PCI-Express bus, or a NuBus. In other implementations, memory 204 may include one or more storage devices, such as a hard drive, flash drive, disk drive, network drive, or other such device or combination of devices, and may be internal to or external from client device 100.

In some implementations, memory 204 may store an operating system and/or one or more applications for execution by processor 202. The device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WIN- DOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

Device 100 may include a network interface 206 for communicating with a server, such as a media server 102, through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). As discussed above, in some embodiments, communications protocols used may be lossy, while in other embodiments, communications protocols may be lossless. In one embodiment, the device 100 communicates with other devices, such as those of a social network provider, storage provider, or content provider, via any type and/or form of gateway or tunneling protocol such as Secure Socket Layer (SSL) or Transport Layer Security (TLS). The network interface 206 may include a built-in network adapter, network interface card, PCMCIA network card, card bus network adapter, wireless network adapter, USB network adapter, modem or any other device suitable for interfacing the device 100 to any type of network capable of communication and performing the operations described herein.

Device 100 may include a user interface 208 for controlling a media application 212 and/or identifying or requesting a media stream to receive and display. User interface 208 may include one or more input devices, such as keyboards, mice, trackpads, trackballs, microphones, dials, touch pads, touch screen, buttons, switches, and drawing tablets, which may be connected via a wired interface, such as a universal serial bus (USB) interface, or via a wireless interface, such as a Bluetooth interface. User interface 208 may include visual or audible elements, which may be output via video displays, speakers, projectors, LCD or LED displays, or other such displays 210. In some implementations, visual or audible portions of a user interface 208 may be provided via display 210. For example, a media stream may be received and decoded into a sequence of images for display via display 210.

Device 100 may include a media display application 212, which may be stored in an internal or external memory device 204 and may be executed by a processor 202. Media display application 212 may be an application, applet, daemon, service, server, routine, or executable logic for receiving, decoding, and displaying media streams. Media display application 212 may include a web browser, social media application, streaming audio and/or video application, or other such features. In some implementations, a media display application 212 may enable a user to select media to be streamed to device 100 for display via display 210. In many implementations, a media display application 212 may include social networking features to enable a user to comment on, share, or otherwise interact with streamed media. Media may include audio, video, animation, images, text, and/or interactive elements, or any combination of these or other such elements. As discussed above, media may be segmented and compressed or encoded in a variety of formats for transmission, and may be received, decoded, and joined or concatenated for display by media display application 212. Segments may be of any length, such as one second, two seconds, five seconds, ten seconds, one minute, or any other length. In many implementations, subsequent segments may be of different lengths, for example, based on complexity of content, ends of streams, or any other such reasons. In one such implementation, a first segment with complex data and many moving elements may be only two or three seconds long, while a subsequent segment with a black image with one or two simple titles may be ten or twenty seconds long. Segment length may be dynamically varied by the server during generation of the segments to maintain a constant segment size for any particular representation of the stream. In other implementations, the nominal bitrate for each segment and representation may be constant or near constant, such that given a 5 Mbps stream, a 1-second segment is approximately 5 Mbits, a 2-second segment is approximately 10 Mbits, etc. In some implementations, a media display application 212 may be configured to generate and transmit requests for segments at specified bitrates or in various representations, as discussed above. Requests may be of any type and form. For example, in one implementation, a request for a segment may include an HTTP GET request for a video file at a specified address, the address and/or file name implicitly or explicitly identifying a segment identifier and/or bitrate, such as "segment01_lowquality.mpg" or "segment02_5 mbps.mpg" or any other such identifier. In other implementations, a request may identify a segment and/or bitrate via a parameter-value pair in a dynamic request (e.g. "video.mpg?seg=10&br=5 mbps" or any other such identifier). In still other implementations, a request may identify a segment and/or bitrate via one or more packet header fields, such as an options field, a sequence identifier field, or any other such field or location. In one such implementation, a representation may be identified with one or more flags or predetermined bits within a packet header. Identifications of media, segment number, and/or representation or bitrate in a request may accordingly be placed in any portion of the request, including application layer, transport layer, network layer, or other layer headers or body portions of packets. As discussed in more detail below in connection with FIGS. 3A-6B, requests may be transmitted early, or while a prior request is still pending, with subsequent requests buffered or queued to be processed by the server after completion of prior requests. In some implementations, the media display application 212 may also generate and/or transmit notification messages, or indications that a future request will include specified parameters for bitrate or quality. This may allow the server to begin preparation of segments in advance of receipt of a request message.

In some implementations, memory 204 may include a buffer 214 for buffering media streams or segments, and/or for buffering segment requests for transmission to a server. Buffer 214 may be a circular or ring buffer, or other data structure stored in a memory unit of the device 100. Buffer 214 may comprise any type and form of memory, including NAND or NOR flash memory, Static random access memory (SRAM), Dynamic random access memory (DRAM), Ferroelectric RAM (FRAM), Solid State Drives (SSD), or other such memory. In some implementations, buffer 214 may be referred to as a cache, media storage, clip storage, transmission or receive buffer, or by other such terms.

In some implementations, memory 204 may include a performance monitor 216 for execution by a processor 204. Performance monitor 216 may be an application, service, server, daemon, routine, or other executable logic for monitoring performance or capacity of a network connection between device 100 and a media server. In some implementations, performance monitor 216 may also monitor processing capability of device 100 and/or a media server. In some implementations, a performance monitor 216 may be part of a media display application 212 or an operating system executed by device 100. Performance monitor 216 may monitor packet loss rates, block error rates, processor loads, thread counts, memory utilization, buffer space (including transmission and receive buffers in a network interface 206, as well as buffers of a media display application 212), round trip times for requests and responses, wireless network signal strength, explicit or implicit congestion notifications, or any other such information. Performance monitor 216 may monitor the time period from transmission of a request for a segment to receipt of the segment, sometimes referred to as a round trip time, implicitly including the time period for a server to generate, transcode, and/or transmit the segment. In some implementations, performance monitor 216 may be configured to transmit performance measurement information to a media server 102. Measurement information may be transmitted in one or more fields of a segment request or early identification including packet header fields or body portions of the packet, periodically in a dedicated measurement packet, or by any other such methods. For example, in one implementation, measurement information may be transmitted as parameter-value pairs in an HTTP POST or GET message, while in another implementation, measurement information may be transmitted as an XML message, a string of measurement values having predetermined sections or ranges for each measurement type, or any other such format. In some implementations, measurement information may be provided to a media display application for selection of a next segment type or bitrate. Measurement information may be compared to one or more thresholds, with the media display application configured to request a higher or lower bitrate segment than a previous segment, responsive to measurements being greater than or less than a corresponding threshold. For example, in one implementation, if a round trip time exceeds a threshold, then a media display application 212 may generate a request for a next segment at a lower bitrate than a previously requested segment.

Figure 2B:
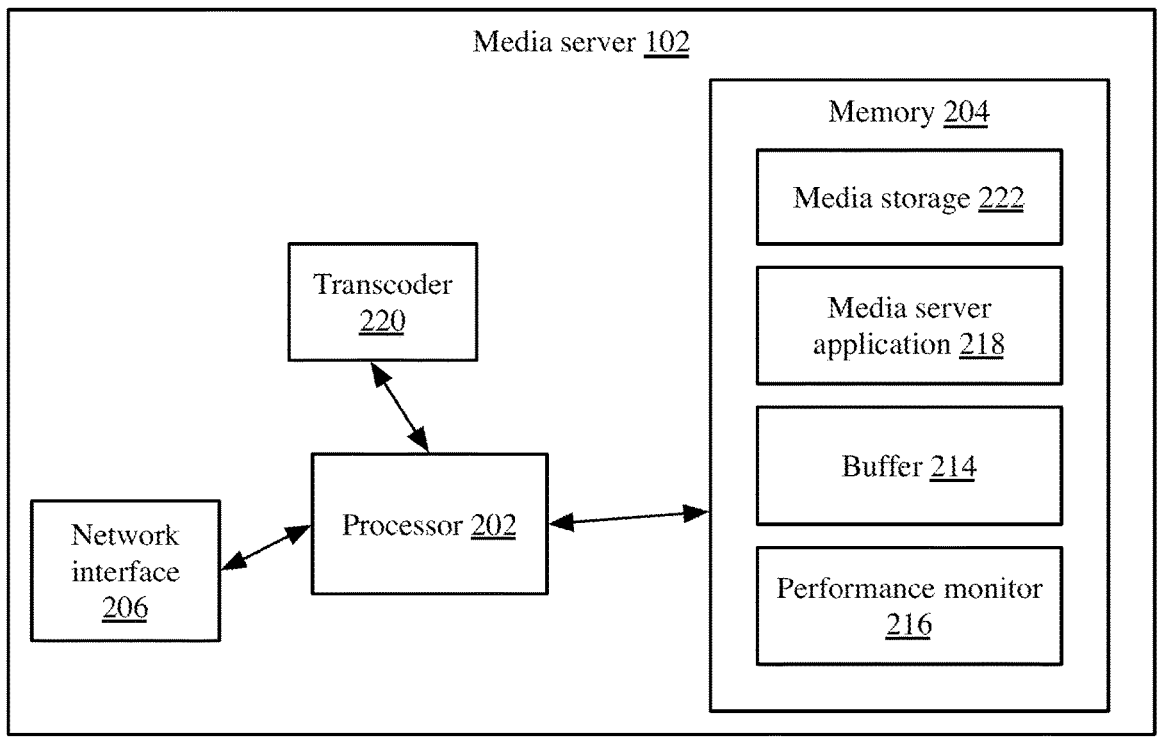
FIG. 2B is a block diagram depicting an embodiment of a media server for ABR streaming.

FIG. 2B is a block diagram depicting an embodiment of a media server 102 for ABR streaming. Media server 102 may be any type of computing device or collection of computing devices, including desktop computers, laptop computers, portable computers, tablet computers, workstations, servers, consoles, server farms or clouds, one or more virtual machines executed by one or more physical machines, or any other type and form of device or devices. Media server 102 may be referred to variously as a content server, streaming server, video server, social media server, or by any other similar term.

As with a device 100, media server 102 may include a processor 202, memory 204, network interface 206, a buffer 214, and/or a performance monitor 216. In some implementations, a media server may include a user interface 208 and/or display 210, while in other implementations, a media server may run "headless" or be controlled and configured by a second computing device.

Media server 102 may execute a media server application 218. Media server application 218 may be an application, service, server, daemon, routine, or other executable logic for receiving and processing requests for streamed media and/or content, segmenting content, encoding content in one or more formats or bitrates, and/or transmitting content segments to a client device 100. Media server application 218 may comprise a web server, file server, storage server, or any other type and form of server. In some implementations, content may be pre-recorded or stored content, and media server application 218 or another application may segment the content and encode the segments in a variety of encoding formats or bitrates for ABR streaming. In other implementations, content may be live, including news or sporting events, one way or two way video conferencing content, or any other such content. In such implementations, media server application 218 may include functionality for recording or receiving live content, encoding or transcoding said content, and segmenting the content for transmission to one or more client devices.

In some implementations, a media server 102 may include a transcoder 220. Transcoder 220 may be an application, server, service, daemon, routine or other executable logic for transcoding a segment of media from a first encoding format or bitrate to a second encoding format or bitrate. In some implementations, transcoder 220 may be a hardware device or combination or hardware and software. Transcoder 220 may include a decoder for decoding an encoded segment of content, and an encoder for re-encoded the decoded segment of content in a new format. Transcoder 220 may perform entropy encoding, compression, resampling, scaling, or any other type and form of operations to reduce, or in some implementations, increase a bitrate of data.

Transcoder 220 may obtain data for transcoding from media storage 222, which may comprise any type and form of data storage device. In some implementations, as shown, media storage 222 may be internal to media server 102 such as a hard drive, flash drive, tape drive, optical drive, or other type and form of storage device. In other implementations, media storage 222 may be external but locally connected to media server 102, such as one or more external drives. In still other implementations, media storage 222 may be network accessible by media server 102, such as a network storage device, storage server, storage cloud, or other such device or set of devices. In such implementations, transcoder 220 may obtain data for transcoding via a network interface 206. Media storage 222 may store media files of any type and format, including compressed or uncompressed formats.

As discussed above, in some implementations, a media server 102 may execute a performance monitor 216 and monitor the capacity of a network connection between a client device 100 and media server 102, and/or a processing capacity of a client device 100 and/or media server 102. In one such implementation, media server 102 may predict, based on a comparison of performance measurements to one or more thresholds, the bitrate, quality, or representation that will be identified in a next segment request transmitted by a client device 100. A media server application 218 and/or transcoder 220 may begin transcoding or encoding a next segment based on the predicted representation, such that upon subsequent receipt of a matching or corresponding request, the media server 102 may be shortly or immediately ready to transmit the next segment to the client. A request may be considered a corresponding request if the request does not match the prediction exactly, but may be considered close enough (e.g. within a predetermined range from the predicted bitrate, etc.) that the server may transmit the segment with the predicted parameters.

Figure 3A:
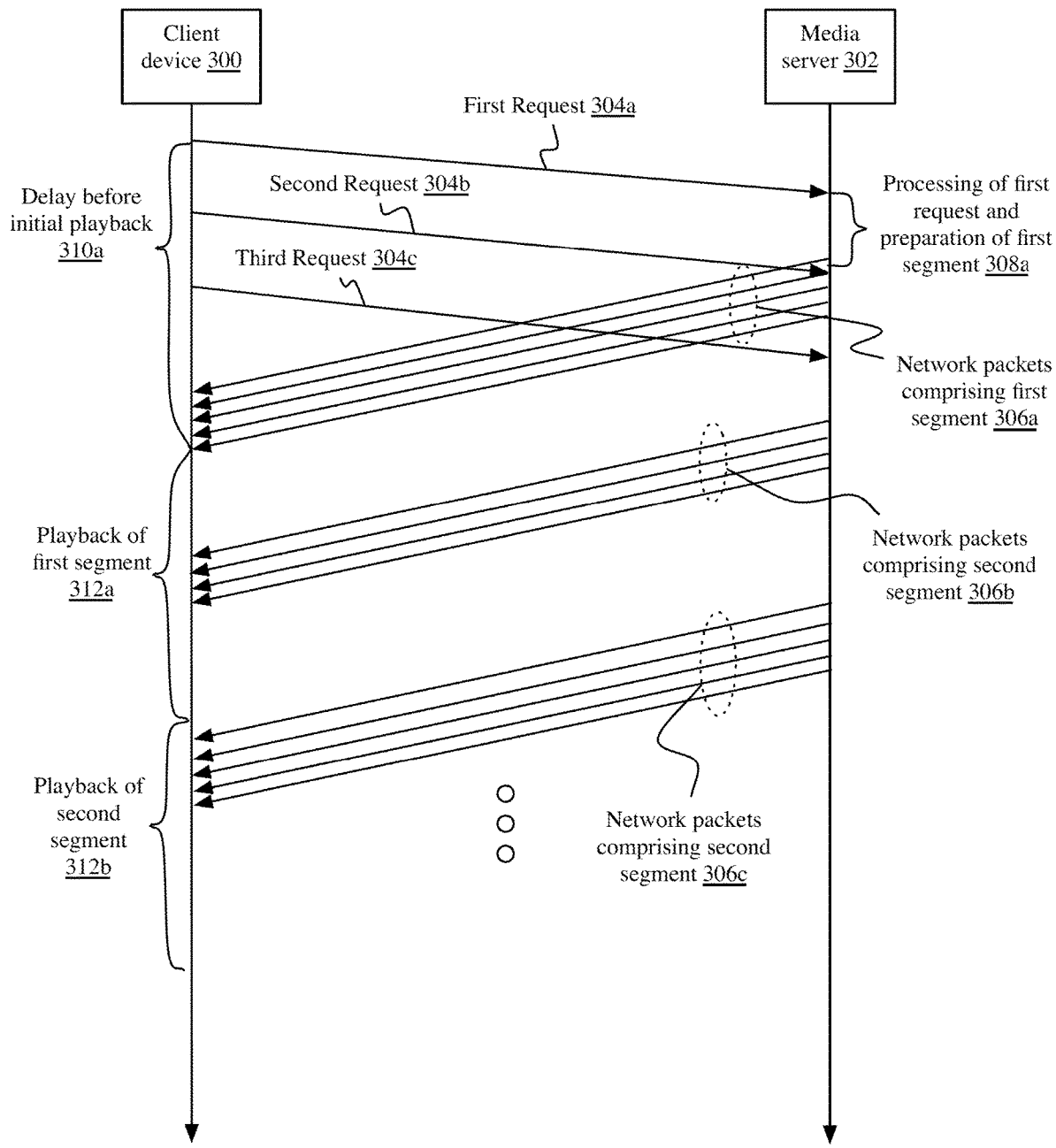
FIG. 3A is a signal flow diagram depicting an embodiment of ABR streaming with early requesting of segments.

FIG. 3A is a signal flow diagram depicting an embodiment of ABR streaming with early requesting of segments. In contradistinction to the implementation illustrated in FIG. 1B, the early requests of FIG. 3A allow a media server 302 to begin processing segments for a second (and third) request in advance of typical receipt of requests for the segments. Specifically, as shown, a client device 300 may transmit a first request 304a to a media server 302. The request may include an identification of an item of content, a segment of the content, and/or a bitrate or quality of the segment requested. Rather than waiting for receipt of the corresponding segment, the client device 300 may send out a second request 304b (and, in some implementations, a third request 304c, or any other number of requests). The media server 302 may store or buffer the additional incoming requests 304b and 304c until processing of the first request and preparation of the first segment 308a is complete. Upon completing processing, encoding, or transcoding of the first segment or a portion of the first segment (e.g. for implementations in which processing of multiple segments may be pipelined), or upon beginning transmission of the first segment 306a or packets of the first segment to the client device, the media server may retrieve a next request from the buffer, and immediately begin processing and/or transcoding a requested next segment. Such processing or transcoding may proceed during transmission of the first segment 306a in many implementations. This may be repeated for each additional segment request in the buffer, as shown. In many implementations, processing or transcoding of the second segment 306b may be completed before or as transmission of the first segment 306a is completed, such that the server may immediately begin transmitting the second segment 306b to the client device. The second segment 306b may be received by the client device 300 well in advance of typical receipt without using early requests, such that network and processing dead time are minimized, no additional delays are incurred, and the client device may request future segments at a higher bitrate or quality than in implementations not utilizing early requests. The server 302 may retain requests in the buffer for a predetermined period of time or may retain a predetermined number of requests and/or may maintain a state machine for client device 300 identifying a currently playing or most recently transmitted segment. The server may be configured to complete transmission of a first segment prior to transmitting a subsequent segment, as shown.

In some implementations, second (and subsequent) requests 304b-304c may be sent before the client device 300 begins receiving the first segment 306a. In other implementations, subsequent requests may be sent upon receiving the beginning of the first segment 306a, but before the end of the first segment.

Figure 3B:
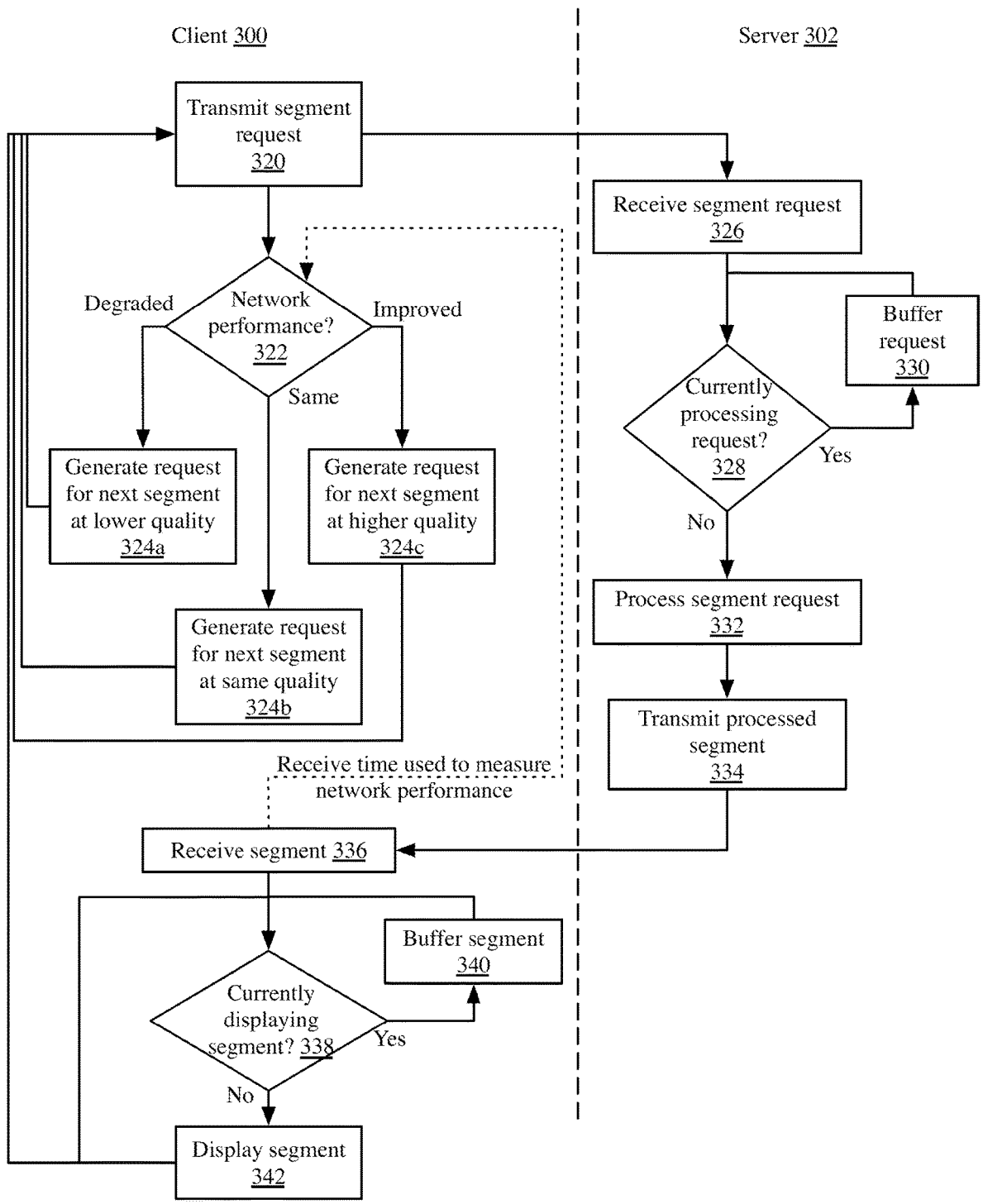
FIG. 3B is a flow chart depicting a method of ABR streaming with early requesting of segments, according to one implementation.

FIG. 3B is a flow chart depicting a method of ABR streaming with early requesting of segments, according to one implementation. At step 320, a client device 300 may transmit a request for a segment. The request may include an identification of an item of content or stream, a segment number or identifier, and a requested bitrate, quality, or representation. The request may be transmitted via any type and form of network, as discussed above. In some implementations, transmission of a first request may include establishing a communication session with a server 302, authenticating or logging in to the server or otherwise providing credentials for the stream, or performing any other such functions.

At step 322, the client 300 may monitor a performance of the network and/or performance of the client 300 and/or server 302. In many implementations, step 322 may be performed periodically or in parallel with steps 326-334 while the client device 300 is waiting to receive a segment and/or prior to transmitting a next request. As discussed above, monitoring performance may comprise monitoring one or more characteristics, including network congestion, latency, round trip time, processor load, memory usage, buffer fullness, block error rates, packet loss rates, time to receive an entire segment after requesting the segment or after the end of receipt of a previous segment, or any other such characteristics, and comparing characteristic values to one or more thresholds. For example, a characteristic of round trip time from the transmission of a request for a segment until receipt of the entire segment may be compared to a threshold, which may be based on a nominal segment playback length (e.g. a ten second segment). Such a threshold may include a safety margin, such as an additional 5 or 10% of the length, or any other such amount. If the round trip time exceeds the nominal segment playback length (and the safety margin, in implementations using one), the next segment may be requested at a reduced bitrate. Conversely, if the round trip time is significantly less than the nominal segment playback length (e.g. less than 50% of the segment playback length, or any other such value), the next segment may be requested at an increased bitrate. Multiple thresholds may be set for any characteristic, and a quality or bitrate may be selected based on whether the characteristic exceeds one or more thresholds. For example, in some implementations in which multiple qualities or bitrates are available for selection, a plurality of thresholds may be set (e.g. 30% of the segment playback length, 50% of the segment playback length, and 70% of the segment playback length). If the round trip time is less than 70% of the playback length, but more than 50%, the next segment may be selected at a next higher bitrate; if the round trip time is less than 50% but more than 30% of the playback length, the next segment may be selected at a still higher bitrate; and if the round trip time is less than 30% of the playback length, the next segment may be selected at a highest bitrate. Similar thresholds for longer times may be used to decrease the rate, with larger decreases applied responsive to exceeding longer time thresholds. Similarly, multiple characteristics may be compared to a plurality of thresholds via a Boolean comparison. For example, in one such implementation, a client may request a high quality or bitrate for a next segment if latency is below a threshold and CPU utilization is below a second threshold and network bandwidth is above a third threshold, etc.

Based on the comparison at step 322, in some implementations, the client 300 may determine whether network or device performance or capability has degraded from a previous segment request, stayed the same, or improved. Responsive to the determination, the client may respectively generate a request for a next segment at a lower quality than a previous request at step 324a, generate a request for a next segment at the same quality at step 324b, or generate a request for a next segment at a higher quality at step 324c. In some implementations in which two or three predetermined bitrates are available, each of steps 324a-324c may indicate to generate a request at a specific bitrate of the two or three predetermined bitrates. In other implementations with a greater number of predetermined bitrates, the client may change requested rates by one unit or predetermined bitrate at a time (e.g. from 2 Mbps to 3 Mbps on a first iteration, then 3 Mbps to 4 Mbps on a next iteration, etc.). In some other implementations, such as where the server may dynamically transcode the content into any requested bitrate, steps 322-324 may be performed by selecting a bitrate based on the comparison of one or more characteristics to one or more thresholds according to preset policies. For example, a policy may indicate that a client should request a 5 Mbps bitrate for a next segment, responsive to measured network performance of at least 5 Mbps but less than 10 Mbps (or another potential performance level for a segment request), CPU utilization being below 30%, and client processing latency being less than 25 ms, etc.; while another policy may indicate that the client should request a 3 Mbps bitrate for a next segment responsive to CPU utilization being above 70%. As discussed above in connection with FIG. 3A, after generating a request for a next segment at one of steps 324a-324c, step 320 may be repeated to transmit the next segment request without waiting for completion of transmission of a previously requested segment.

At step 326, the server 302 may receive the request for the segment (e.g. the first segment or a subsequent segment). As discussed above, the request may identify the content or stream, the requested segment, and/or the bitrate or quality requested. At step 328, the server may determine whether a request is currently being processed. A request may be currently being processed if the server is retrieving a segment from storage, encoding or transcoding a segment, and/or transmitting the segment to the client 300. If a request is currently being processed, the server 302 may store the request in a buffer at step 330. Buffer 330 may be a first-in, first-out (FIFO) buffer, such that a buffered request for a second segment received from a client is serviced before a request for a third segment received from the client. In many implementations, buffered requests may have priority over newly received segment requests, such that the server 302 fulfills any request in the buffer before responding to an incoming request at step 326.

At step 332, the server may process the segment request. As discussed above, the server may process the request by retrieving a previously encoded segment at the requested quality or bitrate, by encoding a segment recorded from live content at the requested quality or bitrate, by transcoding a segment from a first format into a second format, or by any other such methods. At step 334, the server may transmit the processed or transcoded segment to the client.

At step 336, the client may receive the transmitted segment from the server. As shown, the receipt time may be used in some implementations to monitor and determine network performance at step 322. If a prior segment is currently being displayed or decoded at step 338, then at step 340, the newly received segment may be stored in a FIFO buffer of the client. In other implementations, multiple segments may be buffered in advance prior to beginning playback to mitigate interruptions, and all segments may be stored in the FIFO buffer. In some implementations, such as where playback is to begin immediately, then at step 342, the segment may be decoded and provided to a display of the client. In either implementation, once playback or decoding has begun, a next segment may be retrieved from the buffer for decoding and subsequent display at step 342. In some implementations, decoding may be pipelined, with multiple segments being decoded simultaneously. Steps 338-342 or 336-342 may be iteratively repeated for additional segments. Similarly, steps 320-324 and/or steps 326-334 may be iteratively repeated for additional segment requests, without waiting for transmission of any particular segment to be complete. This may reduce latency and delays in transmission of ABR streams, at the expense of additional buffers on the server and/or client.

Figure 4A:
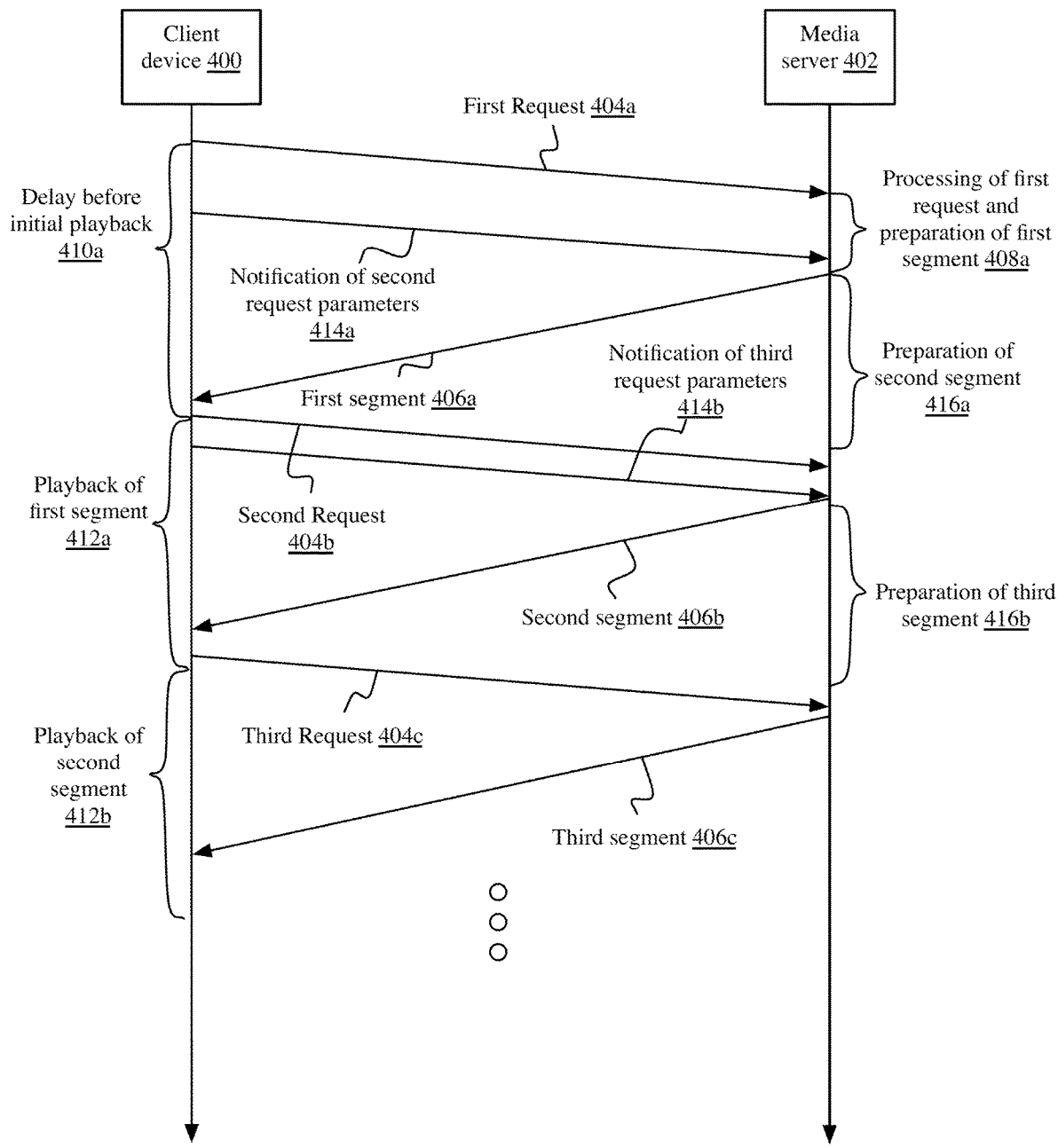
FIG. 4A is a signal flow diagram depicting an embodiment of ABR streaming with early client indication.

FIG. 4A is a signal flow diagram depicting an embodiment of ABR streaming with early client indication. Similar to the implementation shown in FIG. 3A, a client device 400 may transmit a first request 404a to a media server 402, and the media server 402 may process the request and prepare a first segment 408a. While waiting for the transmission of the first segment 406a, the client device may monitor network characteristics and performance characteristics of the client and/or media server. As in FIGS. 3A and 1B, the segment 406a may be transmitted as a plurality of packets, but is shown here as a single line for clarity. The client device may determine a bitrate or quality for a request for a second segment, and may transmit an early notification of parameters (e.g. bitrate, quality, segment number, etc.) for the second request at 414a. This may be based on an assumption that the network characteristics will not change, or may be based on other indicators of network characteristics (e.g. an acknowledgement of receipt of the first request, a congestion notification received from an intermediary router, etc.). For example, in one implementation in which the first segment is divided among several packets, an early notification may be sent after receipt of the first packet but before the segment has been fully received. In other implementations, the early notification may be skipped for a second or additional segments, so that sufficient data may be received to measure the network performance. In such implementations, early notifications may begin at any subsequent time.

In some implementations, when the media server finishes preparing the first segment at 408a and/or begins transmitting the first segment at 406a, at 416a, the media server may immediately begin preparing the second segment according to the parameters in the notification 414a. In other implementations in which encoding or transcoding is pipelined, the media server may begin preparing the second segment according to the parameters in the notification 414a while finishing preparation or beginning transmission of the first segment. Unlike the implementation of FIG. 3A, in some implementations of early notifications, the media server 402 need not remember a state of the client device 400 or queue multiple segment requests, but rather merely implement a newly received request or notification, with processed segments stored in a buffer for future requests. In a similar implementation, the media server 402 may maintain a record of anticipated future requests based on received notifications or a record of received notifications for which corresponding requests have not yet been received.

Once the client device receives the first segment 406a, the client may transmit a second request 404b consistent with the parameters identified in notification 414a. In some implementations, request parameters of the second request 404b may not be identical to the parameters in the notification 414a, but may be considered to be consistent with or correspond to the parameters of the notification responsive to falling within a predetermined range from parameters of the request. As shown, in many implementations, the media server 402 may immediately or shortly be able to respond with the second segment 406b, as the segment may have been already prepared based on notification 414a or preparations may have been begun. The client may similarly transmit a notification of parameters for a third request 414b, responsive to monitored network or device performance characteristics. At 416b, the media server 402 may also begin preparing the third segment in accordance with notification 414*b*, while the second segment 406*b* is being transmitted. The process may continue for additional requests and segments, as shown.

Figure 4B:
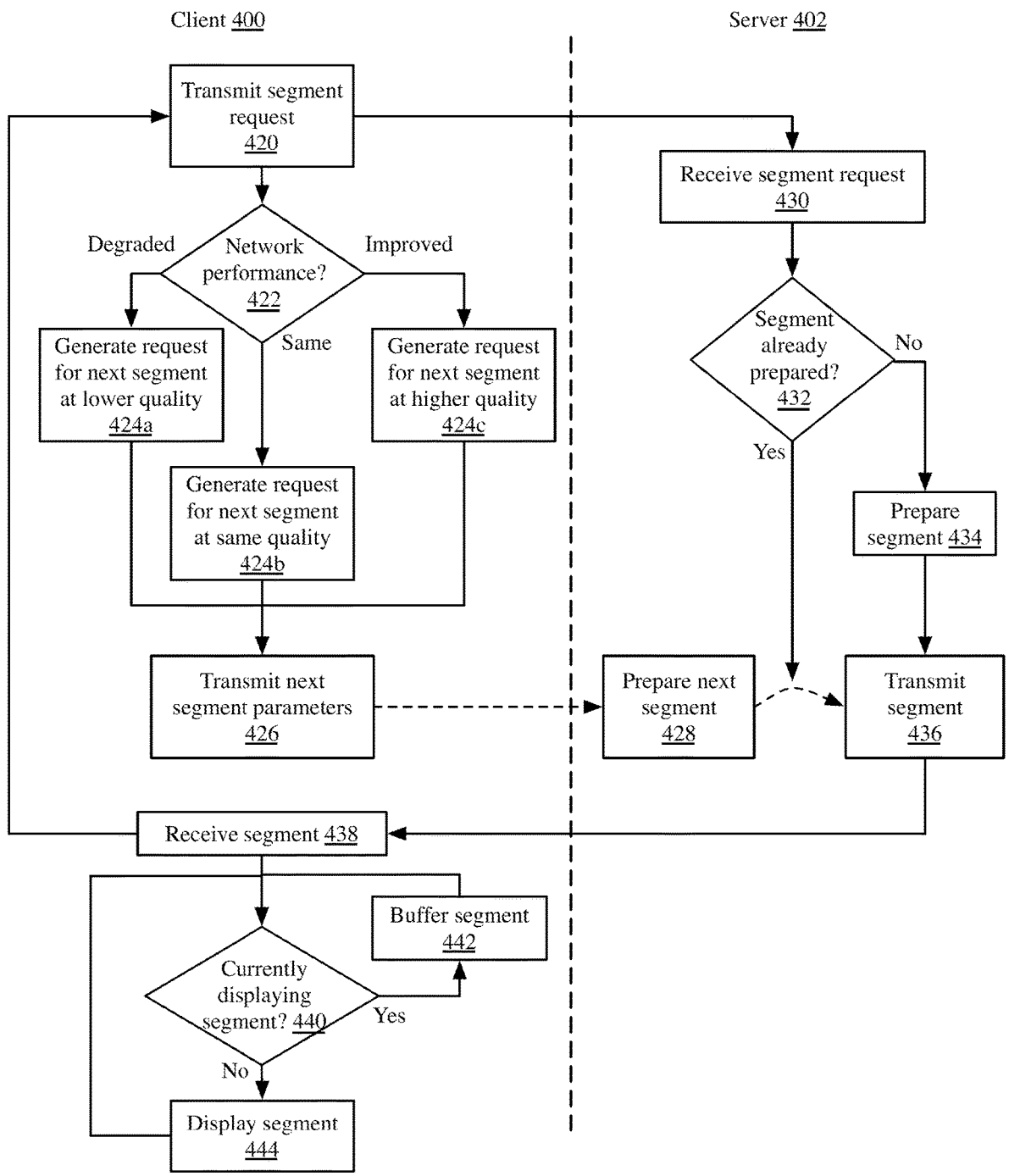
FIG. 4B is a flow chart depicting a method of ABR streaming with early client indication, according to one implementation.

FIG. 4B is a flow chart depicting a method of ABR streaming with early client indication, according to one implementation. Similar to FIG. 3B, a client 400 may transmit a segment request to a server 402 at step 420. The client may also determine network and device performance at step 422 and may determine whether performance has degraded, stayed the same, or improved as discussed above and/or may select a bitrate or quality for a next segment. At step 426, rather than transmitting a new request as in the implementation of FIG. 3B, the client 400 may transmit a message identifying the segment parameters of the next request to be transmitted. The message may not request transmission of a segment, but merely identify bitrate, quality, segment identifier, content identifier, etc. or any other such information.

As with the implementation of FIG. 3B, the server may receive the segment request at step 430. If no segment has been prepared (e.g. if the request is for the first segment), then at step 434, the server may prepare the first segment. Preparing the segment may include encoding, transcoding, segmenting, retrieving, or otherwise processing the segment for transmission, including performing a portion of any of these operations, such as in implementations in which multiple segments are prepared simultaneously via pipelined operations. The segment may be transmitted to the client device at step 436.

The client device may receive the segment at step 438, and, as in steps 336-342 of the implementation of FIG. 3B, may display the segment or buffer the segment for encoding and display after completing a current decoding of a prior segment. As discussed above in connection with FIG. 3B, a time of receipt of the segment at step 438 may be used for measuring or monitoring network performance at step 422. Additionally, responsive to receiving the segment at step 438, in a second iteration of step 420, the client device may transmit the segment request for the next segment in accordance with the parameters transmitted in the notification at step 426. As shown, responsive to receiving the notification at step 426, the server may prepare the next segment for transmission at step 428 in accordance with the parameters in the notification. Accordingly, after receiving the request for the next segment transmitted at the second iteration of step 420, the server may determine at step 432 that the next segment has already been prepared. In the second iteration of step 436, the server may transmit the next segment prepared at step 428, reducing processing latency as discussed above.

Accordingly, multiple threads may operate in parallel in implementations of the method of FIG. 4B, with monitoring and creation and transmission of notifications performed in parallel with transmission of segment requests and display of segments by the client; and preparation of next segments performed in parallel with transmission of present segments by the server.

Figure 5A:
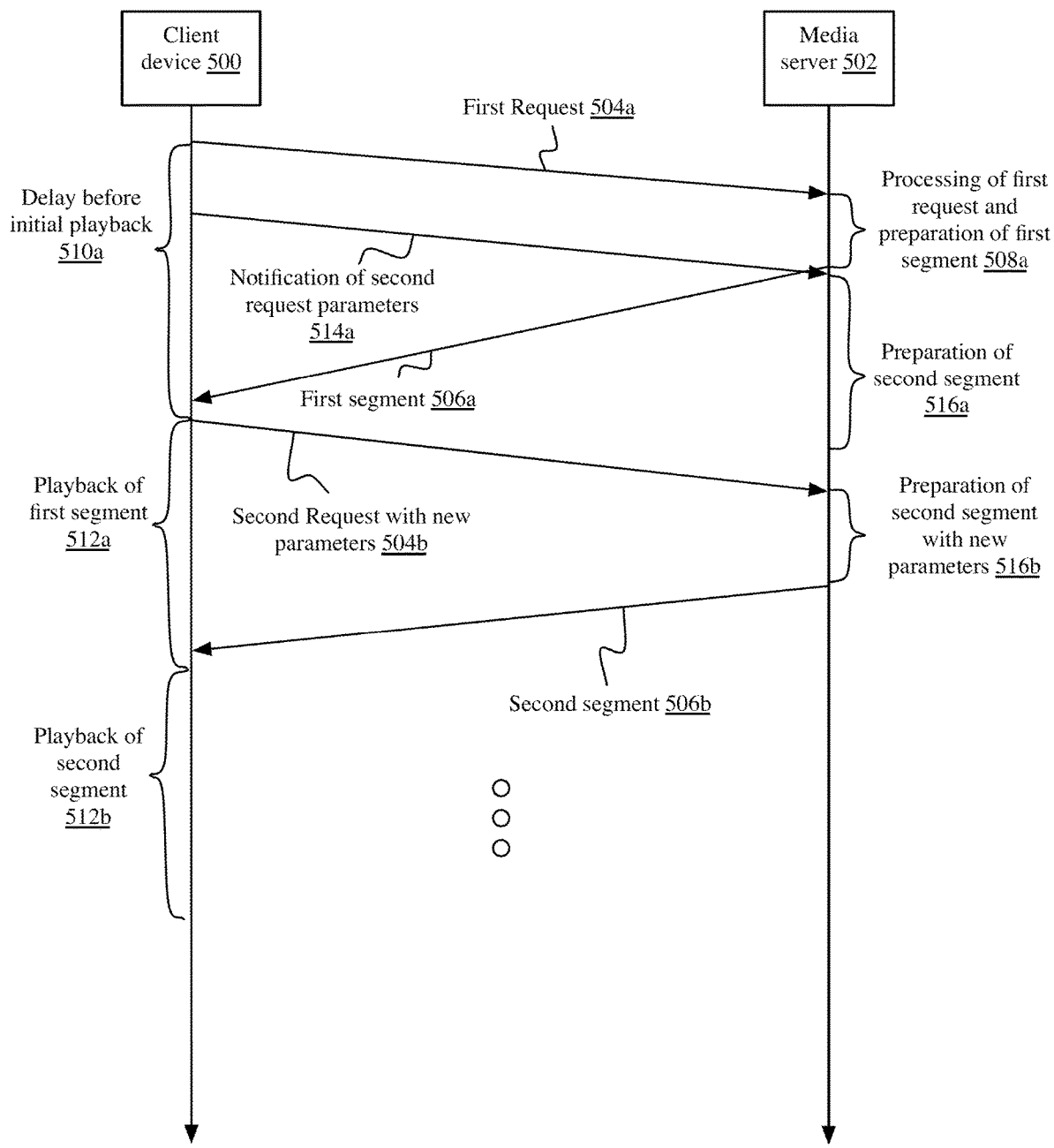
FIG. 5A is a signal flow diagram depicting another embodiment of ABR streaming with early client indication.

In a further implementation, responsive to network or device performance characteristics that vary or degrade between transmission of next segment parameters at step 426 and transmission of the corresponding request at the next iteration of step 420, the client may not be bound to transmit the same parameters in the request as were transmitted in the notification. Specifically, FIG. 5A is a signal flow diagram depicting another embodiment of ABR streaming with early client indication. FIG. 5A is similar to the implementation illustrated at FIG. 4A. However, after transmission of the notification of second request parameters at 514*a*, the client device may determine that network or device performance characteristics have varied and a new quality or bitrate should be selected. In many implementations, the client device may make such a determination responsive to degradation of performance characteristics. The client device may transmit the second request 504*b* with new parameters as shown, responsive to receiving the first segment 506*a*.

As shown, in the implementation of FIG. 5A, the effort preparing the second segment at 516*a* is wasted, as the second segment is re-prepared at 516*b* in accordance with the parameters of the second request 504*b*. However, and particularly for quickly degrading performance characteristics, this may allow the system to avoid interruptions or latency, as the second segment re-prepared at 516*b* may be able to be transmitted faster at 506*b* and/or processed and displayed faster at 512*b* than may have been possible for the originally prepared second segment, particularly if the request is for a smaller picture size and/or significantly lower quality. In some implementations, if a time to prepare and transmit the second segment at 516*b* and 506*b* may exceed a time to transmit the second segment already prepared at 516*a*, the media server may disregard the parameters of the second request 504*b* and transmit the second segment prepared at 516*a*. The server may estimate the transmission time for the already prepared segment based on monitoring network characteristics, such as a time from beginning transmission of a segment to when a next segment is requested, for implementations in which the segment is requested upon completion of receipt of the prior segment.

Figure 5B:
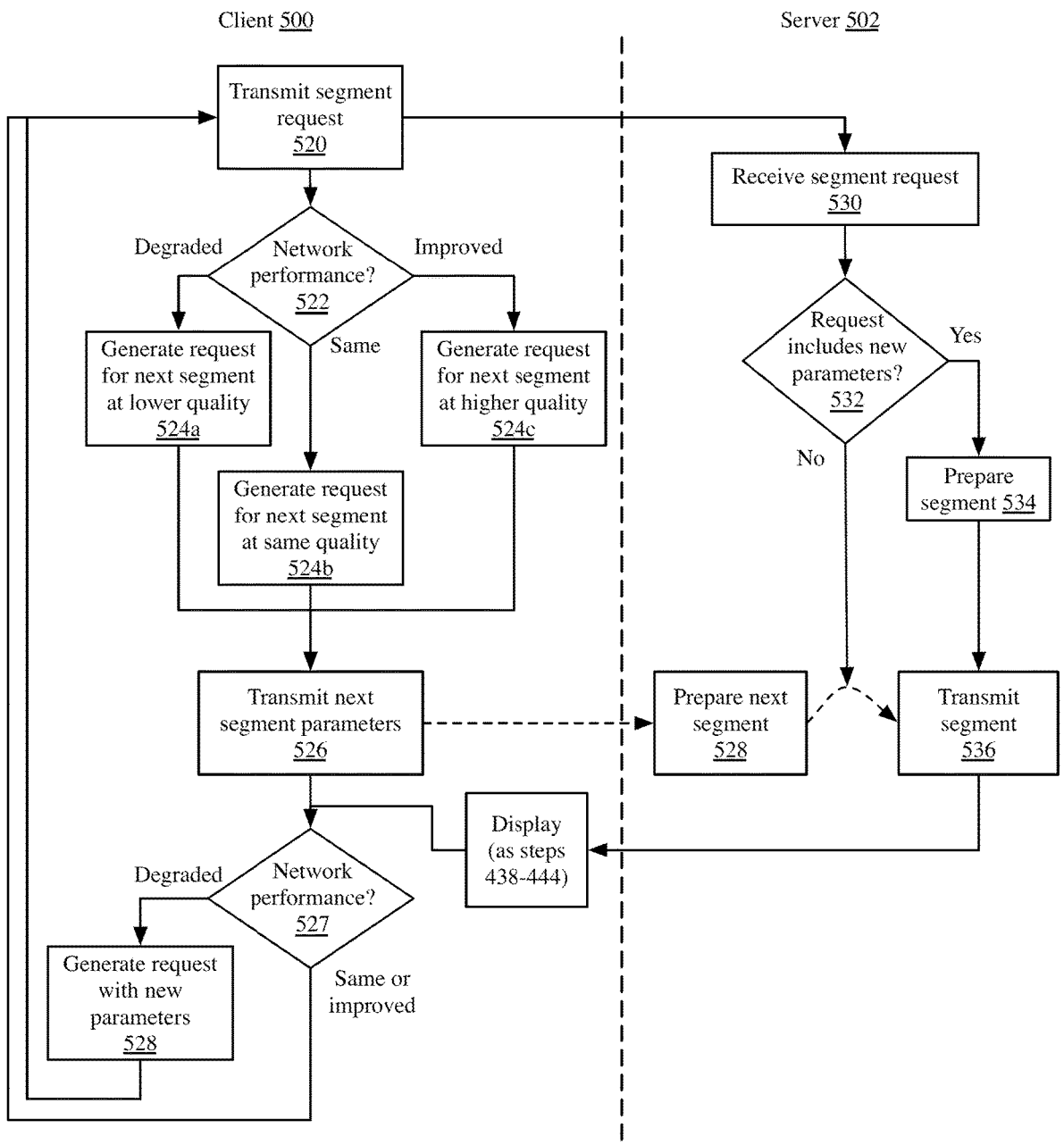
FIG. 5B is a flow chart depicting a method of ABR streaming with early client indication, according to another implementation.

FIG. 5B is a flow chart depicting a method of ABR streaming with early client indication, according to another implementation. FIG. 5B is similar to implementations of the method of FIG. 4B discussed above. Initial transmission of the request, monitoring, and transmission of the next segment notification at steps 520-526 may be identical to steps 420-426. After transmission of the notification, at step 520, the client may again monitor network or device performance characteristics. If the characteristics are the same as determined at step 522, then the method may be continued in an identical fashion to the method of FIG. 4B, transmitting the next segment request in the second iteration of step 520 after receiving and displaying the prior segment in a similar fashion to steps 438-444 (illustrated in a single box).

If the client determines that characteristics have degraded, then at step 528, the client may generate a request with new parameters according to the monitored characteristics, as discussed above. Conversely, if characteristics have improved, then at step 528, the client may generate a request for a higher quality segment. This may be useful in instances where network conditions have significantly improved in a short time, or if segment lengths are long, such that the server has time to prepare the new, higher quality representation. Upon receiving the prior segment, in the next iteration of step 520, the client may transmit the new request generated at step 528.

At step 530, the server may receive the segment request from the client. At step 532, the server may determine if the request includes new parameters. Similar to step 432, if the request includes new parameters (e.g. if the request is the first request, or if the request is a new request generated at step 528 responsive to degrading characteristics), then the server may prepare the next segment in accordance with the parameters at step 534. The previously prepared segment with the prior parameters may be discarded in some implementations, or may be stored to serve future requests from other clients (such as in implementations in which the media server is transcoding a live stream that may be subsequently re-streamed). Otherwise, as discussed above, responsive to receiving the notification transmitted at step 526, the server may prepare the next segment at step 528 and may transmit the segment at step 536. Accordingly, the method of FIG. 5B provides additional flexibility and responsiveness to changing conditions.

As discussed above, in many implementations, server 502 may have begun preparing a content segment or have partially prepared a content segment at step 528 when a segment request is received at step 530 with different parameters. For example, the server may be preparing or may have prepared a first portion of a segment with a bitrate of 1 Mbps in accordance with a previously received early notification, and a request may arrive from the client for the segment with a different bitrate, such as 800 Kbps. In some implementations, as discussed above, the first portion may be discarded and encoding of the segment restarted in accordance with the new parameter. In other implementations, the server may continue preparing the segment in accordance with the parameter of the early notification. However, if the client has requested a lower bitrate due to network congestion or slowdown, the server may not be able to complete transmission of the segment prepared in accordance with the parameter of the early notification before a client buffer is exhausted or without triggering further congestion mitigation processes. For example, the client may perceive the additional time to receive the segment prepared in accordance with the higher bitrate of the early notification as additional network delay, and may transmit an early notification for a subsequent segment at an even lower bitrate. This may cause the system to quickly drop to a low quality, low bitrate representation before recovering, or may require additional client side buffering to compensate.

In another implementation, the server may change encoding parameters while encoding the segment, such that a first portion of the segment is encoded in accordance with a first parameter (e.g. a parameter received in an early notification), and a second portion of the segment is encoded in accordance with a second parameter (e.g. a parameter received in a subsequent segment request). If the second parameter is associated with a lower quality than the first parameter, this may result in reduced bandwidth requirements to transmit the segment, and may prevent triggering of congestion mitigation processes by the client. For example, given a 10 second segment, the server may prepare a first portion of the segment (e.g. 5 seconds) with a bitrate of 1 Mbps and, responsive to receiving a segment request including a parameter corresponding to an 800 Kbps bitrate, may prepare a second portion (e.g. 5 seconds) of the segment with the bitrate of 800 Kbps. The total segment is therefore 9 Mb rather than 10 Mb, and may be transmitted to the client in less time. Although discussed primarily in terms of reductions in quality, in some implementations, quality may be increased with the second portion encoded in accordance with a higher requested parameter.

In a further implementation, the server may "undershoot" or select a third parameter for encoding the second portion, such that the total segment is encoded in accordance with the requested second parameter. For example, given the same values above for segment length (e.g. 10 seconds), early notification parameter (e.g. 1 Mbps), and subsequent request parameter (e.g. 800 Kbps), the server may select a fourth parameter such that the encoded segment is 8 Mb in size (corresponding to 10 seconds at 800 Kbps), such as 600 Kbps (e.g. (5 seconds*1 Mbps)+(5 seconds*600 Kbps)=8 Mb=(10 seconds*800 Kbps). The resulting encoded segment may be transmitted in a time similar to transmission of the segment if it were entirely encoded in accordance with the parameter of the request. Generally, in such implementations, the server may determine the third parameter as equal to [(segment length*requested bitrate)−(first portion*encoded bitrate)]/[segment length−first portion]. Although discussed primarily in terms of reductions in quality, quality may be increased in some implementations, via a similar "overshoot" method, with the server selecting a fourth parameter higher than the requested third parameter.

Figure 6A:
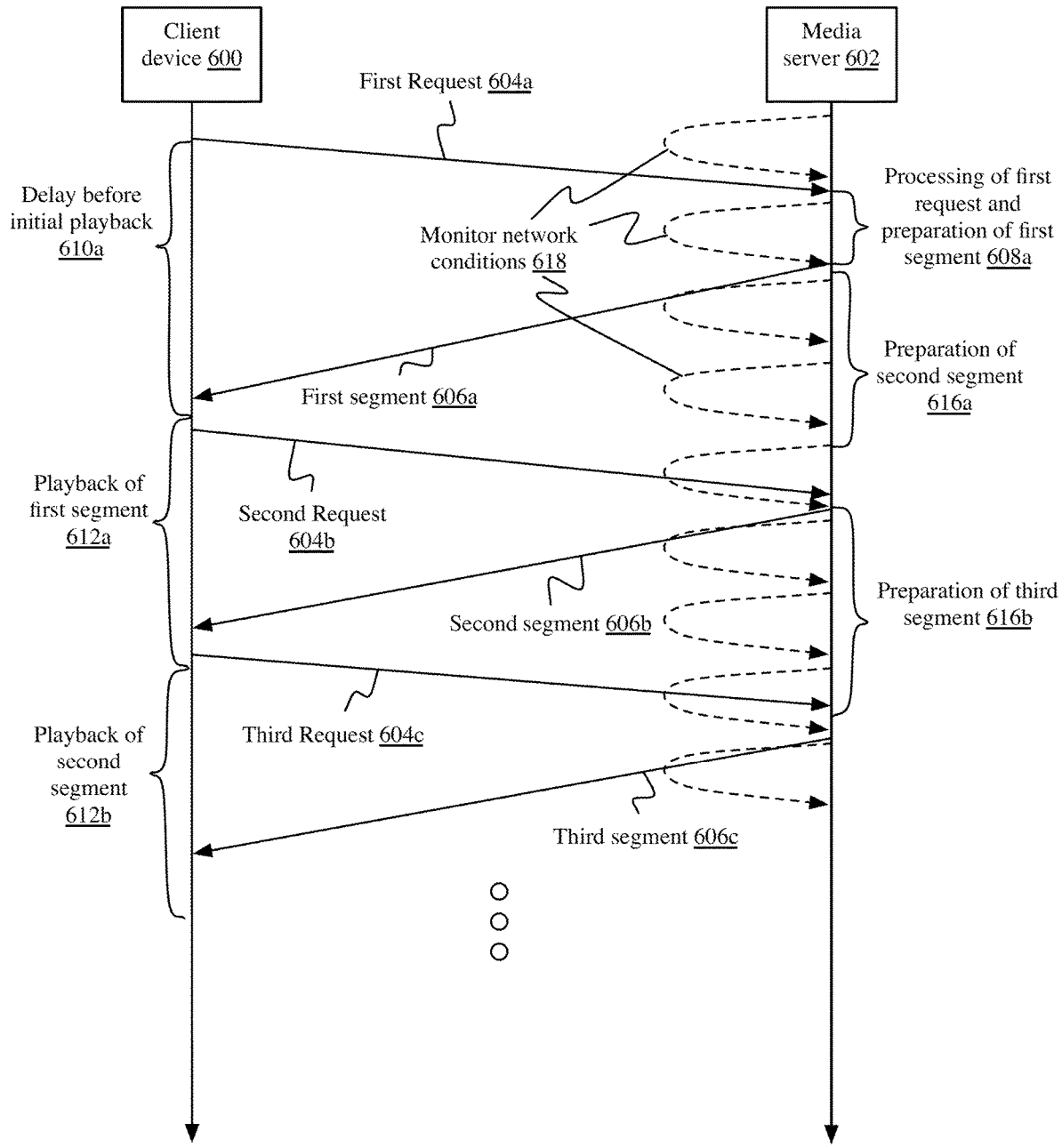
FIG. 6A is a signal flow diagram depicting an embodiment of ABR streaming with server-based rate prediction.

As discussed above, in some implementations, a media server may monitor device and network characteristics and/ or receive a notification of characteristics from a client, and may predict a bitrate or quality that the client will request for a next segment, allowing the server to begin preparing the next segment early without requiring explicit notifications. For example, FIG. 6A is a signal flow diagram depicting an embodiment of ABR streaming with server-based rate prediction. Similar to the implementation discussed above in connection with FIG. 1B, a client device 600 may transmit requests 604a-604c normally after receiving the previously requested segment 606a-606c. However, to reduce latency, in some implementations, the server may monitor network and device conditions (e.g. via periodic or continuous monitoring 618), and may predict the quality or bitrate that the client will request for a next segment. The server may prepare the segments in accordance with the predictions (e.g. responsive to conditions determined at monitoring 618). If the predictions are correct, then upon receiving the request from the client, the server may be able to immediately respond with the prepared segment, reducing network or processing dead time, and reducing the time taken to fulfill client requests. Additionally, even if the predictions are incorrect, the server may still be able to send segments it had prepared or started to prepare. For example, in one implementation, if the server has fully prepared or mostly prepared a segment at a first bitrate and the client requests the segment at a slightly lower bitrate, the additional time taken to re-prepare the segment at the slightly lower bitrate may be longer than the additional time taken to transmit the segment at the first bitrate. Accordingly, it may be more efficient to transmit the segment at the first bitrate than to re-prepare the segment. In a similar implementation, such as when a segment has been partially prepared in accordance with predicted parameters, upon receiving a request for the segment with different parameters, the server may dynamically adjust the parameters used for preparing the segment such that the resulting completely prepared segment is compatible with the needs of the client and the network. This may include, for example, increasing or decreasing the encoded bitrate mid-segment, increasing or decreasing the resolution mid-segment, adjusting picture rates, adjusting subsampling rates, etc. In other implementations, device and/or network condition monitoring may be performed by the client device, alone or in addition to the media server, and the client may periodically transmit lightweight notifications of conditions. In some implementations, the client need not include an explicit identification of quality to be selected for the next segment in the lightweight notifications, as the server may use the condition measurements to select the corresponding quality for the next segment. In some implementations, condition measurements may be transmitted with a prior request. For example, the client device may transmit a request for a first segment at 604a, and include with the request measurements of one or more network or device characteristics, which may be used by the media server 602 to predict the quality that the client will identify in a second request 604*b*.

In some implementations, monitoring of the network conditions may include monitoring round trip time of packets and acknowledgements between the media server and client device (e.g. at the transport layer), monitoring round trip time of segment requests and responses (e.g. at the application or presentation layer), monitoring packet loss rates, retransmission rates, buffer occupancy vs. bitrate, or any other such characteristics. In implementations using lossy or unacknowledged transport layer protocols (e.g. UDP), monitoring may include periodically transmitting pings or similar packets to the client via a separate protocol and monitoring round trip times or loss rates. In still other implementations, monitoring may include measuring network performance characteristics between the media server and an intermediary device, such as a router or gateway that is between the client device and media server. In yet still other implementations, monitoring of the network conditions may include monitoring timestamps in requests received from the client device. For example, in implementations in which the client requests a next segment upon receipt of a previous segment, the sever may monitor network conditions based on a difference between a timestamp of transmission of a segment and a timestamp in a subsequent request for a next segment. In still other implementations, each request of the client for a segment (e.g. via RTSP) may include an identification of latency between the server and client (e.g. a measurement of round trip time from a request of the client to receipt of the corresponding segment; a measurement of a difference between a transmission timestamp and a time of receipt of a segment; etc.). The server may monitor network conditions via these identifications, and may predict or select an encoding for a next segment accordingly.

Figure 6B:
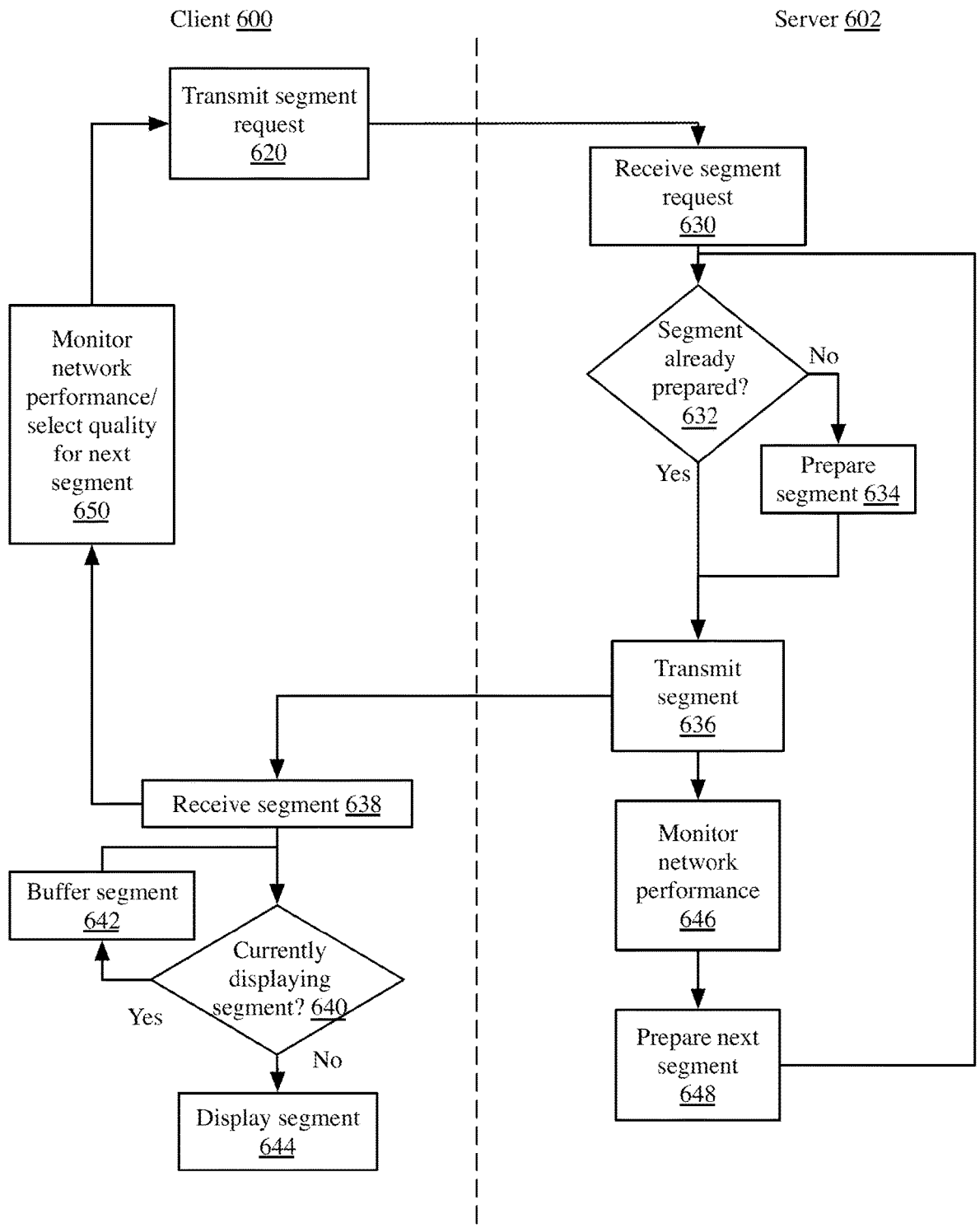
FIG. 6B is a flow chart depicting a method of ABR streaming with server-based rate prediction, according to one implementation.

FIG. 6B is a flow chart depicting a method of ABR streaming with server-based rate prediction, according to one implementation. FIG. 6B is similar to the implementations discussed above in connection with FIGS. 3B, 4B, and 5B, but may reduce latency or otherwise improve performance through server-side predictions. As shown, at step 620, the client may transmit a request for a segment. In some implementations, the request may include one or more identifications of network and/or device parameters, such as via parameter-value pairs in the request, via options fields in a packet header at any layer, or by other such means. The server may receive the request at step 630, prepare the segment at step 634, and transmit the segment to the client at step 636. Simultaneously or after transmission of the segment, at step 646, the server may monitor network and device performance characteristics, and may predict a quality or bitrate that will be selected by the client in a request for a next segment, utilizing the same measurements and thresholds discussed above. In other implementations, monitoring may be performed earlier, such as before the segment is transmitted at step 636. In further limitations, monitoring may be performed during preparation or transmission, and a bitrate of a segment may be dynamically adjusted during processing based on monitored changes to network performance. For example, after beginning preparing a segment at a first quality in accordance with a client request, the server may determine via continuous or intermittent monitoring that the network is too slow to deliver the segment on time. The server may reduce the bitrate of the remainder of the segment accordingly. In some implementations, the server may send a message to the client to tell the client that the server reduced the bitrate or telling the client of the parameters used for the segment. The message may be transmitted separately or may be included in transmission of a segment or a portion of the segment (e.g. in an options field of a header of a packet). The client may use the message and/or parameters to request a next segment using the revised parameters, or may determine whether the parameters for the next segment should be further changed based on the revised parameters. At step 648, the server may prepare the next segment in accordance with the predicted quality or bitrate and may buffer the prepared segment.

After receiving the previous segment at step 638, the client may perform further network performance monitoring and/or determine a quality or bitrate for selecting a next segment at step 650, as discussed above via the comparison of monitored network and/or device characteristics to one or more thresholds. In the second iteration of step 620, the client may transmit a request for the next segment in accordance with the determined quality or bitrate. As the client and server may use the same performance measurements and thresholds, unless conditions are quickly varying, the server may predict the same or similar quality at step 646 as the client subsequently selects at step 650. In other implementations, as discussed above, server-based predictions may vary from request parameters, but may still be used to reduce processing and network dead time and increase efficiency (e.g. by dynamically adjusting encoding or transcoding parameters mid-segment, or by transmitting prepared segments at slightly different bitrates than requested rather than re-preparing the segments). Accordingly, upon receipt of the new segment request, the server may be able to immediately begin transmission of an already-prepared or partially-prepared segment. In some implementations in which segments are processed and transmitted in pipelined operations, partial preparation may include adding the segment to the pipeline and beginning processing such that it may be transmitted with low latency.

Thus, the systems and methods discussed herein provide reduction of processing and transmission latency in implementations of ABR streaming of content, while, in various embodiments, maintaining flexibility for quickly degrading network or device performance characteristics, using stateful or stateless server side processes, and reducing client-to-server communications bandwidth or maximizing the effective use of available server to client communications bandwidth. In addition, many of the implementations discussed herein may be combined, such as utilizing server-side bitrate predictions with stateful requests or predictive rate selection with selection intention notifications.

In one aspect, the present disclosure is directed to a method for adaptive bitrate streaming with early client indication. The method includes receiving, by a media server from a client device, a notification of a parameter of a future request for a segment of content. The method also includes beginning preparation, by the media server, of the segment of content in accordance with the parameter. The method also includes subsequently receiving, by the media server from the client device, a request for the segment of content, the request including the parameter; and transmitting, by the media server, the segment of content prepared in accordance with the parameter.

In some implementations, the parameter of the future request comprises a bitrate for the segment of content. In other implementations, the notification is sent responsive to monitoring of network performance by the client device. In a further implementation, the notification is sent responsive to monitoring of a round trip time by the client device from a transmission of a request for a segment of content to a receipt of the corresponding segment of content (e.g. including network and server processing latency).

In some implementations, the method includes subsequently receiving, by the media server from the client device, a notification of a second parameter of a future request for a second segment of content. The method also includes beginning preparation, by the media server, of the second segment of content in accordance with the second parameter. The method further includes subsequently receiving, by the media server from the client device, a request for the second segment of content, the request including a third parameter. The method also includes beginning preparation, by the media server, of the second segment of content in accordance with the third parameter; and transmitting, by the media server, the second segment of content prepared in accordance with the third parameter. In a further implementation, the method includes discarding the second segment of content prepared in accordance with the second parameter, responsive to receipt of the request for the second segment of content including the third parameter. In another further implementation, the method includes comprising storing the second segment of content prepared in accordance with the second parameter and not transmitted to the client device. In still another further implementation, the second parameter and third parameter are different bitrates for the segment of content, the third parameter determined by the client device responsive to monitoring of network performance.

In some implementations, the method includes receiving, by the media server from the client device, a notification of a second parameter of a future request for a second segment of content; beginning preparation, by the media server, of the second segment of content in accordance with the second parameter; subsequently receiving, by the media server from the client device, a request for the second segment of content, the request including a third parameter different from the second parameter; determining, by the media server, that a first time to prepare and transmit the second segment of content in accordance with third parameter exceeds a second time to transmit the second segment of content prepared in accordance with the second parameter; and transmitting, by the media server, the second segment of content in accordance with the second parameter, responsive to the determination that the first time exceeds the second time.

In some implementations, the method includes subsequently receiving, by the media server from the client device, a notification of a second parameter of a future request for a second segment of content. The method also includes preparing, by the media server, a first portion of the second segment of content in accordance with the second parameter. The method further includes subsequently receiving, by the media server from the client device, a request for the second segment of content, the request including a third parameter different from the second parameter. The method also includes preparing, by the media server, a second portion of the second segment of content in accordance with the third parameter; and transmitting, by the media server, the first portion and second portion of the second segment of content.

In another implementation, the method includes subsequently receiving, by the media server from the client device, a notification of a second parameter of a future request for a second segment of content. The method also includes preparing, by the media server, a first portion of the second segment of content in accordance with the second parameter. The method further includes subsequently receiving, by the media server from the client device, a request for the second segment of content, the request including a third parameter different from the second parameter. The method also includes identifying, by the media server, a fourth parameter such that a combination of a second portion of the second segment prepared in accordance with the fourth parameter and the first portion of the second segment prepared in accordance with the second parameter is equivalent to the second segment prepared in accordance with the third parameter. The method further includes preparing, by the media server, the second portion of the second segment of content in accordance with the fourth parameter; and transmitting, by the media server, the first portion and second portion of the second segment of content.

In another aspect, the present disclosure is directed to a method for adaptive bitrate streaming with early client indication. The method includes transmitting, by a client device to a media server via a network, a request for a first segment of content prepared in accordance with a first parameter. The method also includes monitoring, by the client device, a performance characteristic of the network. The method further includes transmitting, by the client device to the media server via the network, a notification of a second parameter of a future request for a second segment of content, the second parameter selected based on the monitoring of the performance characteristic of the network. The method also includes receiving, by the client device from the media server via the network, the first segment of content; and transmitting, by the client device to the media server via the network, a second request for the second segment of content prepared in accordance with the second parameter.

In some implementations, the first parameter and second parameter comprise a bitrate for the corresponding segments of content. In other implementations, the method includes determining, by the client device based on the monitoring, that the performance characteristic of the network has changed; and the first parameter is different than the second parameter.

In some implementations, the method includes receiving, by the client device from the media server via the network, the second segment of content prepared in accordance with the second parameter; and the media server prepares the second segment of content in accordance with the second parameter responsive to receipt of the notification. In a further implementation, the method includes buffering the received second segment of content, by the client device, during decoding or display of the first segment of content. In another further implementation, the method includes transmitting, by the client device to the media server via the network, a second notification of a third parameter of a future request for a third segment of content; detecting a change in the performance characteristic of the network; and transmitting, by the client device to the media server via the network, a third request for the third segment of content prepared in accordance with a fourth parameter, selected responsive to the detected change in the performance characteristic of the network. In a still further implementation, the method includes receiving, by the client device from the media server via the network, the third segment of content prepared in accordance with the fourth parameter, the media server discarding a portion of the third segment of content prepared in accordance with the third parameter responsive to receipt of the third request. In another still further implementation, the method includes receiving, by the client device from the media server via the network, the third segment of content prepared in accordance with the third parameter, responsive to a determination by the media server that a first time to prepare and transmit the third segment of content in accordance with the fourth parameter exceeds a second time to transmit the third segment of content prepared in accordance with the third parameter.

In yet another aspect, the present disclosure is directed to a method for adaptive bitrate streaming with server-based rate prediction. The method includes receiving, by a media server from a client device via a network, a request for a first segment of content at a first bitrate or with a first parameter value; and preparing, by the media server, the first segment of content at the first bitrate. The method also includes transmitting, by the media server to the client device via the network, the prepared first segment of content. The method further includes monitoring, by the media server, a performance characteristic of the network; determining, by the media server, to prepare a second segment of content at a second bitrate, the second bitrate selected based on the monitored performance characteristic of the network; and begin preparing, by the media server, the second segment of content at the second bitrate, responsive to the determination. The method also includes subsequently receiving, by the media server from the client device, a request for the second segment of content at the second bitrate; and transmitting, by the media server to the client device, the second segment of content prepared responsive to the determination.

In some implementations, the method includes extracting a latency measurement from a prior request of the client device for a segment of content. In another implementation, the method includes determining a difference between a timestamp of a transmission of a segment of content and a timestamp of a subsequent request for a next segment of content. In some implementations, the method includes preparing a first portion of the second segment of content at the second bitrate, and preparing a second portion of the second segment of content at a third bitrate, responsive to detection of a change in the performance characteristic of the network.

In some implementations, the method includes determining, by the media server, to prepare a third segment of content at a third bitrate, the third bitrate selected based on the monitored performance characteristic of the network; and begin preparing, by the media server, the third segment of content at the third bitrate, responsive to the determination. The method also includes subsequently receiving, by the media server from the client device, a request for the third segment of content at a different, fourth bitrate. In one implementation, the method also includes determining to transmit the third segment at the third bitrate; and transmitting, by the media server to the client device, the third segment of content at the third bitrate responsive to the determination. In another implementation, the method also includes determining to transmit a portion of the third segment at the fourth bitrate; and encoding and transmitting the portion of the third segment to the client at the fourth bitrate, responsive to the determination.

Although the disclosure may reference one or more "users", such "users" may refer to user-associated devices or stations, for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A device, comprising: circuitry configured to receive a first parameter for a first request for a segment of content and receive a second parameter for the segment of content, wherein the circuitry is further configured to prepare a first portion of the segment of content in accordance with the first parameter, prepare a second portion of the segment of content in accordance with the second parameter, and transmit the first portion and the second portion of the segment of content.

2. The device of claim 1, wherein the circuitry comprises a server.

3. The device of claim 2, wherein the circuitry comprises a network interface.

4. The device of claim 2, wherein the first parameter and the second parameter comprise a respective bitrate or quality for the respective first portion and the respective second portion.

5. The device of claim 1, wherein the circuitry is configured to provide a third parameter wherein a combination of the second portion of the segment prepared in accordance with the third parameter and the first portion of the segment prepared in accordance with the first parameter has a transmission time equivalent to a transmission time of the segment prepared in accordance with the second parameter.

6. The device of claim 5, wherein the first parameter, the second parameter and the third parameter each comprise a respective bitrate or quality.

7. The device of claim 1, wherein the circuitry monitors network conditions of a network used to provide the first portion and the second portion.

8. The device of claim 7, wherein the circuitry monitors a round trip time, packet loss rate, or retransmission rate of the network.

9. A method, comprising: preparing a first portion of a segment of content in accordance with a first parameter; receiving a second parameter for the segment of content, the first parameter being different from the second parameter; and providing a third parameter wherein a combination of a second portion of the segment prepared in accordance with the third parameter and the first portion of the segment prepared in accordance with the first parameter has a transmission time equivalent to a transmission time of the segment prepared in accordance with the second parameter.

10. The method of claim 9, further comprising: preparing the second portion of the segment of content in accordance with the third parameter; and transmitting the first portion and the second portion of the segment of content.

11. The method of claim 10, wherein the third parameter is provided in response to a determination that a performance characteristic of a network for communicating the first portion of the segment has changed, wherein the first parameter and the second parameter comprise a bitrate or quality for the first portion of the segment of content and a bitrate or quality for the second portion of the segment of content.

12. The method of claim 10, wherein the second parameter is sent by a client device to a server in response to a change of one or more network performance characteristics for a network comprising the server and the client device.

13. A method, comprising: receiving a first parameter for a segment of content; preparing a first portion of the segment of content in accordance with the first parameter; receiving a second parameter for the segment of content; preparing a second portion of the segment of content in accordance with the second parameter; and transmitting the first portion of the segment of content and the second portion of the segment of content.

14. The method of claim 13, wherein the first parameter and the second parameter comprise a respective bitrate or quality for the first portion and a respective bitrate or quality for the second portion of the segment of content, and the preparing the first portion and the preparing the second portion are performed by a server.

15. The method of claim 13, wherein the second parameter is provided in response to a determination by a client device that a performance characteristic of a network has changed, the network comprising a server in communication with a client device.

16. The method of claim 13, wherein the second parameter is provided in response to change in network performance.

17. The method of claim 13, wherein the segment of content is provided as part of a media stream.

18. The method of claim 13, wherein the second parameter is sent in response to a round trip time from a transmission of a request for a previous segment of content to a receipt of the previous segment of content.

19. The method of claim 13, further comprising: receiving, by a server via a network, a request for another segment of content.

20. The method of claim 13, wherein the first parameter is part of a request that identifies the segment and a bitrate or quality.

21. A device, comprising: circuitry configured to provide for a first request for a segment of content to a server associated with a network and determine a performance of the network, wherein the circuitry is configured to provide a second request for the segment of content, wherein the first request comprises a first parameter for transmission of the segment of content and the second request comprises a second parameter for the transmission of the segment of content, wherein the second parameter is provided in response to the performance, wherein the circuitry is configured to receive a first portion of the segment of content in accordance with the first parameter, and receive a second portion of the segment of content in accordance with the second parameter.

22. The device of claim 21, wherein the circuitry comprises a client device.

23. The device of claim 21, wherein the circuitry is further configured to buffer the second portion if the first portion is being displayed.

24. The device of claim 21, wherein the first parameter indicates a first bit rate or quality and the second parameter indicates a second bit rate or quality.

25. The device of claim 21, wherein the circuitry is configured to receive the second portion transmitted according to a third parameter wherein a combination of the second portion of the segment prepared in accordance with the third parameter and the first portion of the segment prepared in accordance with the first parameter has a transmission time equivalent to a transmission time of the segment prepared in accordance with the second parameter.

* * * * *